US008285810B2

United States Patent
Svendsen et al.

(10) Patent No.: US 8,285,810 B2
(45) Date of Patent: Oct. 9, 2012

(54) AGGREGATING MEDIA COLLECTIONS BETWEEN PARTICIPANTS OF A SHARING NETWORK UTILIZING BRIDGING

(75) Inventors: Hugh Svendsen, Chapel Hill, NC (US); Harold Sutherland, San Jose, CA (US)

(73) Assignee: Eloy Technology, LLC, Wilmington, DE (US)

( * ) Notice: Subject to any disclaimer, the term of this patent is extended or adjusted under 35 U.S.C. 154(b) by 575 days.

(21) Appl. No.: 12/104,675

(22) Filed: Apr. 17, 2008

(65) Prior Publication Data

US 2009/0265416 A1 Oct. 22, 2009

(51) Int. Cl.
G06F 15/16 (2006.01)

(52) U.S. Cl. ........ 709/217; 709/231; 709/205; 709/238; 709/218

(58) Field of Classification Search .................. 709/231, 709/217, 205, 297, 218, 238
See application file for complete search history.

(56) References Cited

U.S. PATENT DOCUMENTS

| 5,544,313 | A | 8/1996 | Shachnai et al. |
|---|---|---|---|
| 6,466,980 | B1 | 10/2002 | Lumelsky et al. |
| 6,633,903 | B1 | 10/2003 | Gould |
| 6,714,215 | B1 | 3/2004 | Flora et al. |
| 6,728,760 | B1 | 4/2004 | Fairchild et al. |
| 6,886,035 | B2 | 4/2005 | Wolff |
| 6,907,458 | B2 | 6/2005 | Tomassetti et al. |
| 6,920,281 | B1 | 7/2005 | Agnibotri et al. |
| 6,953,886 | B1 | 10/2005 | Looney et al. |
| 6,954,790 | B2 | 10/2005 | Forslow |
| 6,987,221 | B2 | 1/2006 | Platt |
| 6,993,532 | B1 | 1/2006 | Platt et al. |
| 7,024,424 | B1 | 4/2006 | Platt et al. |
| 7,103,645 | B2 | 9/2006 | Leighton et al. |
| 7,113,999 | B2 | 9/2006 | Pestoni et al. |
| 7,117,266 | B2 | 10/2006 | Fishman et al. |
| 7,197,490 | B1 | 3/2007 | English |
| 7,197,557 | B1 | 3/2007 | Asar et al. |
| 7,296,031 | B1 | 11/2007 | Platt et al. |
| 7,313,571 | B1 | 12/2007 | Platt et al. |

(Continued)

FOREIGN PATENT DOCUMENTS

CN 1395794 A 2/2003

(Continued)

OTHER PUBLICATIONS

"DNS Service Discovery (DNS-SD)," http://www.dns-sd.org/, printed May 18, 2010, 4 pages.

(Continued)

Primary Examiner — Lan-Dai T Truong
(74) Attorney, Agent, or Firm — Withrow & Terranova, PLLC

(57) ABSTRACT

Systems and methods are provided for aggregating a local media collection of a user with one or more shared media collections shared with the user to provide an aggregate media collection for the user. In general, one or more shared media collections shared with the user are first discovered. Optionally, the user may select one or more of the shared media collections for aggregation with the local media collection of the user. The shared media collections selected by the user, or alternatively all of the shared media collections, are then aggregated with the local media collection of the user to provide an aggregate media collection for the user. In one embodiment, bridging of users is provided to expand the sharing of media collections beyond those having direct relationships with the sharing user.

21 Claims, 13 Drawing Sheets

U.S. PATENT DOCUMENTS

| | | |
|---|---|---|
| 7,333,092 B2 | 2/2008 | Zadesky et al. |
| 7,363,361 B2 | 4/2008 | Tewari et al. |
| 7,373,144 B1 | 5/2008 | Kirkpatrick et al. |
| 7,373,644 B2 | 5/2008 | Aborn |
| 7,426,537 B2 | 9/2008 | Lee et al. |
| 7,483,958 B1 | 1/2009 | Elabbady et al. |
| 7,548,934 B1 | 6/2009 | Platt et al. |
| 7,636,509 B2 | 12/2009 | Davis |
| 7,668,939 B2 | 2/2010 | Encarnacion et al. |
| 7,680,814 B2 | 3/2010 | Mercer et al. |
| 7,680,959 B2 | 3/2010 | Svendsen |
| 7,685,210 B2 | 3/2010 | Plastina et al. |
| 7,689,510 B2 | 3/2010 | Lamkin et al. |
| 7,696,427 B2 | 4/2010 | West et al. |
| 7,702,728 B2 | 4/2010 | Zaner et al. |
| 7,730,216 B1 | 6/2010 | Issa et al. |
| 7,747,620 B2 | 6/2010 | Beaupre |
| 7,779,097 B2 | 8/2010 | Lamkin et al. |
| 7,792,756 B2 | 9/2010 | Plastina et al. |
| 7,840,620 B2 | 11/2010 | Vignoli et al. |
| 8,059,646 B2 | 11/2011 | Svendsen et al. |
| 8,224,899 B2 | 7/2012 | Svendsen et al. |
| 2002/0029384 A1 | 3/2002 | Griggs |
| 2002/0069278 A1 | 6/2002 | Forslow |
| 2003/0032419 A1 | 2/2003 | Shibasaki et al. |
| 2003/0037157 A1 | 2/2003 | Pestoni et al. |
| 2003/0093790 A1 | 5/2003 | Logan et al. |
| 2003/0110510 A1 | 6/2003 | Gong et al. |
| 2003/0167295 A1 | 9/2003 | Choo |
| 2003/0212804 A1 | 11/2003 | Hashemi |
| 2003/0227478 A1 | 12/2003 | Chatfield |
| 2005/0149480 A1 | 7/2005 | Deshpande |
| 2005/0149508 A1 | 7/2005 | Deshpande |
| 2005/0154608 A1 | 7/2005 | Paulson et al. |
| 2005/0240494 A1 | 10/2005 | Cue et al. |
| 2005/0251565 A1 | 11/2005 | Weel |
| 2005/0251576 A1 | 11/2005 | Weel |
| 2005/0262246 A1 | 11/2005 | Menon et al. |
| 2006/0008256 A1 | 1/2006 | Khedouri et al. |
| 2006/0044466 A1 | 3/2006 | Kelly et al. |
| 2006/0069998 A1 | 3/2006 | Artman et al. |
| 2006/0143236 A1 | 6/2006 | Wu |
| 2006/0167956 A1 | 7/2006 | Chasen et al. |
| 2006/0179078 A1 | 8/2006 | McLean |
| 2006/0195515 A1 | 8/2006 | Beaupre et al. |
| 2006/0195902 A1* | 8/2006 | King et al. ............... 726/21 |
| 2006/0212478 A1 | 9/2006 | Plastina et al. |
| 2006/0218613 A1 | 9/2006 | Bushnell |
| 2006/0242106 A1 | 10/2006 | Bank |
| 2006/0245367 A1 | 11/2006 | Jeffery et al. |
| 2006/0265349 A1 | 11/2006 | Hicken |
| 2006/0265467 A1 | 11/2006 | Jang |
| 2007/0025194 A1 | 2/2007 | Morse et al. |
| 2007/0031109 A1 | 2/2007 | Tsuboi et al. |
| 2007/0033225 A1 | 2/2007 | Davis |
| 2007/0038647 A1 | 2/2007 | Thomas et al. |
| 2007/0048713 A1 | 3/2007 | Plastina et al. |
| 2007/0048714 A1 | 3/2007 | Plastina et al. |
| 2007/0061416 A1 | 3/2007 | Gould |
| 2007/0083556 A1 | 4/2007 | Plastina et al. |
| 2007/0168544 A1* | 7/2007 | Sciammarella ............... 709/231 |
| 2007/0168554 A1 | 7/2007 | Dinger et al. |
| 2007/0220081 A1 | 9/2007 | Hyman |
| 2007/0239778 A1* | 10/2007 | Gallagher ................. 707/104.1 |
| 2007/0244856 A1 | 10/2007 | Plastina et al. |
| 2007/0244880 A1 | 10/2007 | Martin et al. |
| 2007/0266001 A1 | 11/2007 | Williams et al. |
| 2007/0276826 A1 | 11/2007 | Chand et al. |
| 2007/0282949 A1 | 12/2007 | Fischer et al. |
| 2007/0299681 A1 | 12/2007 | Plastina et al. |
| 2008/0005179 A1 | 1/2008 | Friedman et al. |
| 2008/0016205 A1 | 1/2008 | Svendsen |
| 2008/0052349 A1* | 2/2008 | Lin ............... 709/203 |
| 2008/0052371 A1 | 2/2008 | Partovi et al. |
| 2008/0080392 A1 | 4/2008 | Walsh et al. |
| 2008/0091717 A1 | 4/2008 | Garbow et al. |
| 2008/0104122 A1 | 5/2008 | Hempleman et al. |
| 2008/0132175 A1 | 6/2008 | Loeb et al. |
| 2008/0133441 A1 | 6/2008 | West et al. |
| 2008/0133759 A1 | 6/2008 | Weel |
| 2008/0147711 A1 | 6/2008 | Spiegelman et al. |
| 2008/0147798 A1* | 6/2008 | Paalasmaa et al. .......... 709/204 |
| 2008/0154798 A1* | 6/2008 | Valz ............... 705/400 |
| 2008/0154967 A1 | 6/2008 | Heikes et al. |
| 2008/0155057 A1 | 6/2008 | Khedouri et al. |
| 2008/0176511 A1 | 7/2008 | Tan et al. |
| 2008/0189617 A1 | 8/2008 | Covell et al. |
| 2008/0205205 A1 | 8/2008 | Chiang et al. |
| 2008/0208823 A1 | 8/2008 | Hicken |
| 2008/0222188 A1 | 9/2008 | Watson et al. |
| 2008/0256032 A1 | 10/2008 | Vignoli et al. |
| 2009/0019156 A1 | 1/2009 | Mo et al. |
| 2009/0037005 A1 | 2/2009 | Larsen et al. |
| 2009/0060467 A1* | 3/2009 | Grigsby et al. ............... 386/124 |
| 2009/0063975 A1 | 3/2009 | Bull et al. |
| 2009/0070438 A1 | 3/2009 | Bartholomew |
| 2009/0080635 A1* | 3/2009 | Altberg et al. ........... 379/216.01 |
| 2009/0083117 A1 | 3/2009 | Svendsen et al. |
| 2009/0094317 A1 | 4/2009 | Venkitaraman |
| 2009/0138505 A1* | 5/2009 | Purdy ............... 707/104.1 |
| 2009/0164199 A1 | 6/2009 | Amidon et al. |
| 2009/0164452 A1 | 6/2009 | Yogaratnam et al. |
| 2009/0164600 A1* | 6/2009 | Issa et al. ............... 709/215 |
| 2009/0165356 A1 | 7/2009 | Blum |
| 2009/0177654 A1 | 7/2009 | Beaupre et al. |
| 2009/0193338 A1 | 7/2009 | Fiatal |
| 2009/0217352 A1 | 8/2009 | Shen et al. |
| 2009/0222392 A1* | 9/2009 | Martin et al. ............... 706/46 |
| 2009/0254643 A1* | 10/2009 | Terheggen et al. ........... 709/223 |
| 2009/0265218 A1 | 10/2009 | Amini et al. |
| 2009/0265356 A1* | 10/2009 | Hyman et al. ............... 707/10 |
| 2009/0265426 A1 | 10/2009 | Svendsen et al. |
| 2009/0326970 A1 | 12/2009 | Estrada et al. |
| 2010/0071070 A1* | 3/2010 | Jawa et al. ............... 726/26 |
| 2010/0107117 A1 | 4/2010 | Pearce et al. |
| 2010/0115553 A1 | 5/2010 | Van Flandern et al. |
| 2010/0134647 A1 | 6/2010 | Orboubadian |
| 2010/0198818 A1* | 8/2010 | McLaughlin ............... 707/723 |
| 2011/0004840 A1 | 1/2011 | Feinberg et al. |
| 2011/0060994 A1* | 3/2011 | Maxwell et al. ............... 715/730 |
| 2011/0208831 A1 | 8/2011 | Ho et al. |

FOREIGN PATENT DOCUMENTS

| | | |
|---|---|---|
| CN | 1909633 A | 2/2007 |
| CN | 101021852 A | 8/2007 |
| CN | 101115019 A | 1/2008 |
| WO | 2007/069004 A1 | 6/2007 |
| WO | 2007/092053 A1 | 8/2007 |
| WO | 2007137626 A1 | 12/2007 |

OTHER PUBLICATIONS

Tallberg, Mathias, "P2P-Based Roaming Between Home WLAN Hotspots," http://whitepaper.techworld.com/wireless-networking-wlan-wi-fi/4587/p2p-based-roaming-between-home-wlan-hotspots/, Mar. 1, 2007, 6 pages.

Wu et al., "Next Generation Mobile Multimedia Communications: Media Codec and Media Transport Perspectives," China Communications, Oct. 2006, 15 pages.

Zahariadis et al., "Scalable Content Delivery Over P2P Convergent Networks," 12th IEEE International Symposium on Consumer Electronics, (ISCE 2008), Vilamoura, Portugal, (Apr. 14-16, 2008), 4 pages.

Yufeng Dou et al., "An Approach to Analyzing Correlation between Songs/Artists Using iTMS Playlists," Proceedings of the International Conference on Computational Intelligence for Modelling, Control and Automation and International Conference on Intelligent Agents, Web Technologies and Internet Commerce vol. 1 (CIMCA-IAWTIC'06), vol. 1, pp. 951-956, 2005, 1 page.

"Firefly Media Server :: Home Page," http://www.fireflymediaserver.org/, printed Feb. 3, 2009, 1 page.

"Apple—iTunes—What is iTunes?—A player, a store, and more," http://www.apple.com/itunes/whatis/, printed Aug. 11, 2009, 2 pages.

"LimeWire User Manual," copyright 2000-2005 limewire, 24 pages.

Ripeanu et al, "Mapping the Gnutella Network: Properties of Large-Scale Peer-to-Peer Systems and Implications for System Design," University of Chicago, 2003, 12 pages.

"Celtius XDM Server," copyright 2007, Celtius Ltd., originally found at <http://www.celtius.com/s.asp?p=494>, copy found at Internet Archive, dated Oct. 9, 2007, printed Apr. 28, 2011, 2 pages.

"FLUTE—File Delivery over Unidirectional Transport," Oct. 2004, copyright 2004, The Internet Society, at <http://tools.ieti.org/html/rfc3926>, printed Apr. 19, 2011, 36 pages.

Hua, K.A. et al., "Video Delivery Technologies for Large-Scale Deployment of Multimedia Applications," Proceedings of The IEEE, vol. 92, No. 9, Sep. 2004, pp. 1439-1451, 13 pages.

Kasenna, "Deploying Network-Based PVR Services," Sep. 2004, copyright 2004, Kasenna, Inc., found at <http://www.kasenna.com/downloads/white_papers/Kasenna_NPVR_TimelessTV_White_Paper.pdf>, pp. 1-12.

"RTP, Real-time Transport Protocol," at <http://www.networksorcery.com/enp/protocol/rtp.htm>, copyright 1998-2011, Network Sorcery, Inc., printed Apr. 19, 2011, 13 pages.

U.S. Appl. No. 12/104,574: Non-Final Rejection mailed Feb. 16, 2010.

U.S. Appl. No. 12/104,574: Non-Final Rejection mailed Aug. 3, 2010.

U.S. Appl. No. 12/104,574: Advisory Action mailed Oct. 21, 2010.

U.S. Appl. No. 12/104,574: Non-Final Rejection mailed Mar. 16, 2011.

U.S. Appl. No. 12/104,574: Non-Final Rejection mailed Sep. 6, 2011.

U.S. Appl. No. 12/104,684: Non-Final Rejection mailed Jun. 22, 2010.

U.S. Appl. No. 12/104,684: Non-Final Rejection mailed Oct. 14, 2010.

U.S. Appl. No. 12/104,684: Final Rejection mailed Mar. 25, 2011.

U.S. Appl. No. 12/104,675: Non-Final Rejection mailed Jun. 13, 2011.

U.S. Appl. No. 12/104,675: Non-Final Rejection mailed Nov. 28, 2011.

U.S. Appl. No. 12/104,690: Non-Final Rejection mailed Jul. 7, 2010.

U.S. Appl. No. 12/104,690: Final Rejection mailed Oct. 13, 2010.

U.S. Appl. No. 12/104,690: Advisroy Action mailed Jan. 6, 2011.

U.S. Appl. No. 12/104,690: Non-Final Rejection mailed May 11, 2011.

U.S. Appl. No. 12/104,690: Final Rejection mailed Aug. 22, 2011.

U.S. Appl. No. 12/104,690: Advisory Action mailed Nov. 23, 2011.

U.S. Appl. No. 12/104,690: Non-Final Rejection mailed Dec. 13, 2011.

"How to Share Files in Windows XP," at <http://compnetworking.about.com/od/windo . . . >, from Internet Archive dated Mar. 31, 2006, printed Feb. 26, 2012, 2 pages.

"Microsoft Windows XP tutorial free. Unit 4 Windows Explorer," at <http://www.leacherclick.com/winxp/t_4_1.htm>, copyright Nov. 2005, aulaClic, printed Feb. 26, 2012, 4 pages.

U.S. Appl. No. 12/104,690: Advisory Action mailed Jun. 13, 2012

U.S. Appl. No. 12/104,690: Non-Final Rejection mailed Jul. 16, 2012.

U.S. Appl. No. 12/104,684: Notice of Allowance mailed Jul. 6, 2012.

* cited by examiner

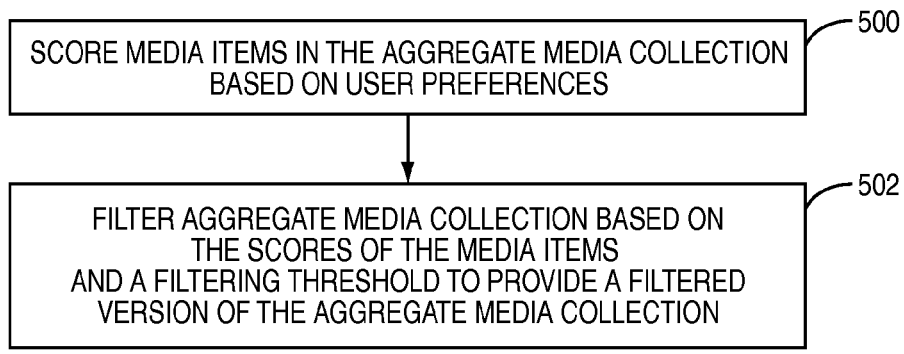
FIG. 8
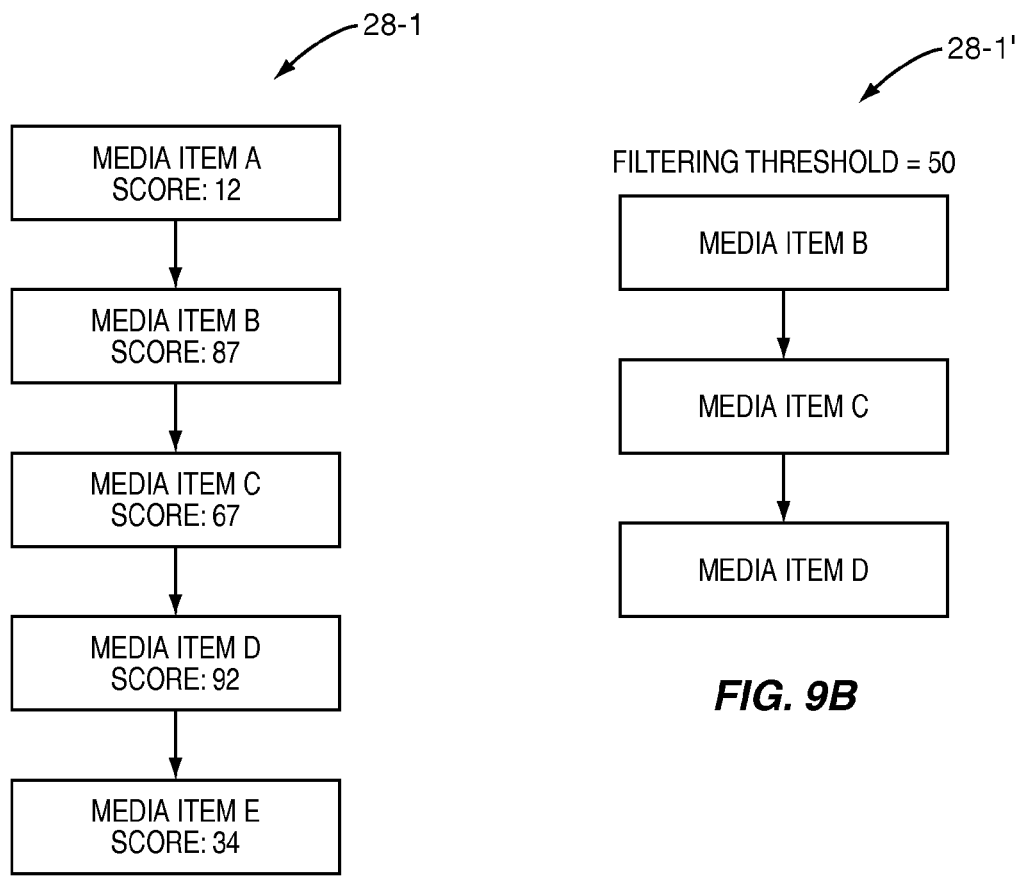
FIG. 9A
FIG. 9B

AGGREGATING MEDIA COLLECTIONS BETWEEN PARTICIPANTS OF A SHARING NETWORK UTILIZING BRIDGING

RELATED APPLICATIONS

The present application is related to commonly assigned U.S. patent application Ser. No. 12/104,572, filed Apr. 17, 2008, entitled "METHOD AND SYSTEM FOR AGGREGATING MEDIA COLLECTIONS BETWEEN PARTICIPANTS OF A SHARING NETWORK"; commonly assigned U.S. patent application Ser. No. 12/104,684, filed Apr. 17, 2008, entitled "AGGREGATING MEDIA COLLECTIONS TO PROVIDE A PRIMARY LIST AND SORTED SUB-LISTS"; and commonly assigned U.S. patent application Ser. No. 12/104,690, filed Apr. 17, 2008, entitled "PRUNING AN AGGREGATE MEDIA COLLECTION," which are hereby incorporated herein in their entirety.

FIELD OF THE INVENTION

The present invention relates to sharing media collections between participants, or users, and more specifically relates to aggregating shared media collections to provide aggregate media collections for the users.

BACKGROUND OF THE INVENTION

With the advent of portable media players, such as the Apple® iPod® portable media players, digital media has become prolific. However, even though user media collections of many users include hundreds if not thousands of media items, no one user owns every media item. As such, users often desire to share their media collections. For example, the Apple® iTunes® media player allows users to share their media collections with up to five users on the same subnetwork. In the Apple® iTunes® media player, the sharing user must designate what portion of their media collection to share (e.g., all, two or more songs, or a playlist). However, users with which the media collection is shared are limited by the fact that the shared media collection is disjoint from their own media collection. Another issue is that sharing is limited to sharing among users in the same subnetwork. Thus, there is a need for an improved system and method for sharing media collections.

SUMMARY OF THE INVENTION

The present invention relates to aggregating a local media collection of a user with one or more shared media collections shared with the user to provide an aggregate media collection for the user. In general, one or more shared media collections shared with the user are first discovered. Optionally, the user may select one or more of the shared media collections for aggregations with the local media collection of the user. The shared media collections selected by the user, or alternatively all of the shared media collections, are then aggregated with the local media collection of the user to provide an aggregate media collection for the user. More specifically, in the preferred embodiment, media collection information identifying media items in the selected shared media collections, or alternatively media collection information identifying all of the shared media collections, is aggregated with media collection information identifying media items in the local media collection of the user to provide the aggregate media collection of the user.

In one embodiment, the shared media collections are identified based on a social network. The social network may be a pre-existing social network or a social network established for the purpose of sharing media collections. Bridging of users within the social network may be utilized to provide indirect relationships between users in the social network. If bridging is not provided, the shared media collections are media collections shared by other users having a direct relationship with the first user in the social network of the first user. If bridging is provided, the shared media collections are media collections shared by other users within a predefined logical distance from the first user in the social network of the first user. The predefined logical distance may be defined as a number of "hops" or degrees of separation in the social network. Alternatively, if bridging is provided, the shared media collections may be aggregate media collections of users having a direct relationship with the first user in the social network. The shared aggregate media collections include media items from local media collections of the users having a direct relationship with the first user in the social network as well as media items from local media collections of users having indirect relationships with the first user in the social network. Media collection information entries for media items in the shared aggregate media collections from the local media collections of users within a predetermined distance from the first user in the social network may then be aggregated with the media collection information identifying media items in the local media collection of the first user to provide the aggregate media collection of the first user.

In one embodiment, the local media collection of the user and the shared media collections are aggregated by aggregating the media collection information for the local media collection and the media collection information for the shared media collections. For the local media collection, the media collection information includes information identifying each media item in the local media collection. Likewise, for each shared media collection, the media collection information includes information identifying each media item in the shared media collection. The media collection information for the local media collection and the media collection information for the shared media collections are aggregated to provide a primary list including a media item entry for each unique media item. For each media item entry in the primary list, a sub-list including a media item entry for each occurrence of the corresponding media item in the local and shared media collections may be provided. The media item entries in a sub-list may be scored based on, for example, quality, bitrate, and availability of the corresponding media item. The media item entry in the sub-list having the highest score may be utilized as the media item entry for the primary list. The primary list is then presented to the user as the aggregate media collection. The sub-lists essentially provide back-ups in the situation where, for example, one of the media items represented by a media item entry in the primary list is no longer available. In addition, in one embodiment, the media items in the aggregate media collection may be scored based on user preferences of the first user to provide a desirability score for each of the media items. Media items having desirability scores less than a predetermined pruning threshold may be filtered to provide a filtered, or pruned, version of the aggregate media collection.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS FIGURES

The accompanying drawing figures incorporated in and forming a part of this specification illustrate several aspects of the invention, and together with the description serve to explain the principles of the invention.

Figure 1:
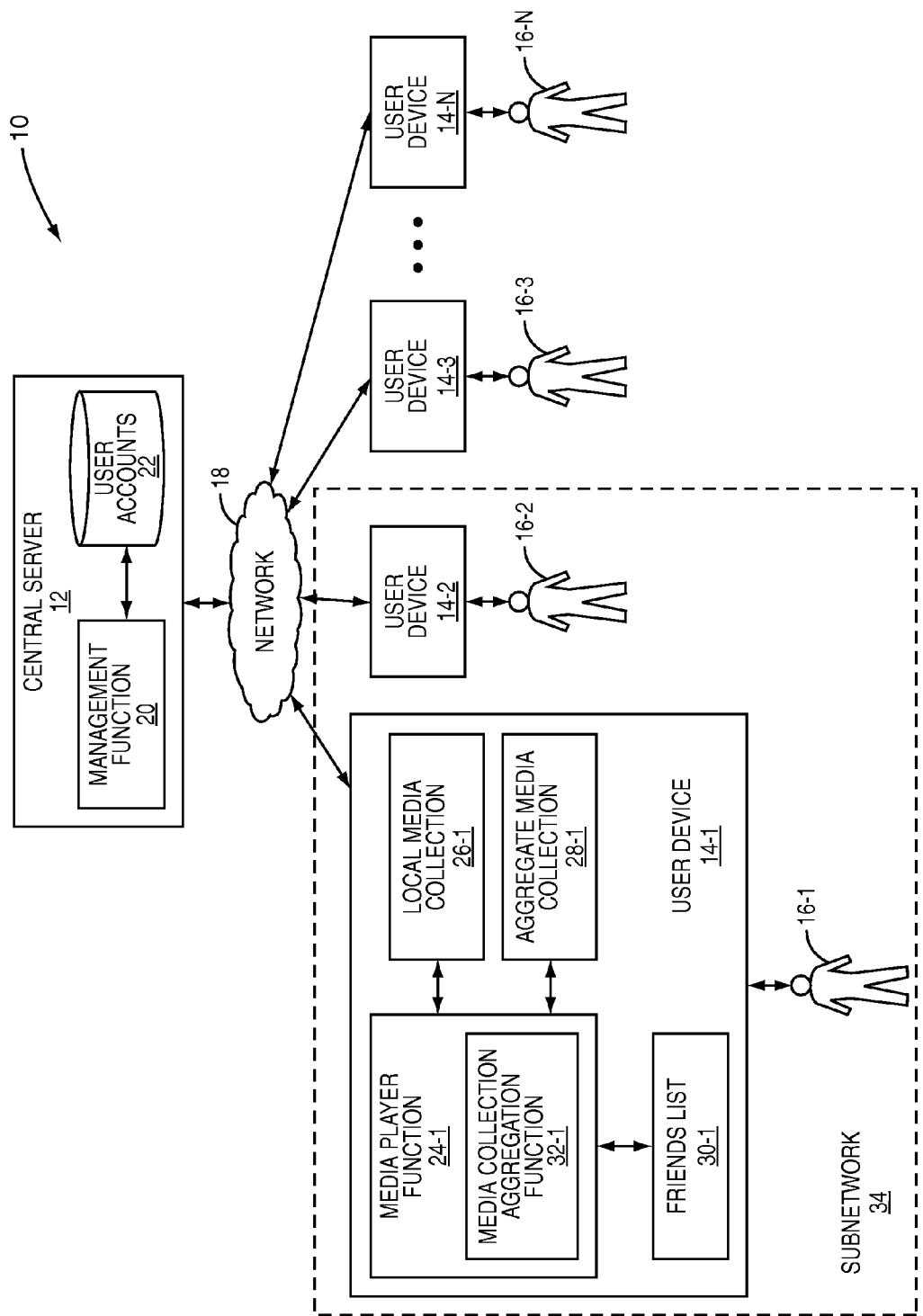
FIG. 1 illustrates a system providing sharing and aggregation of media collections according to one embodiment of the present invention.
Figure 5:
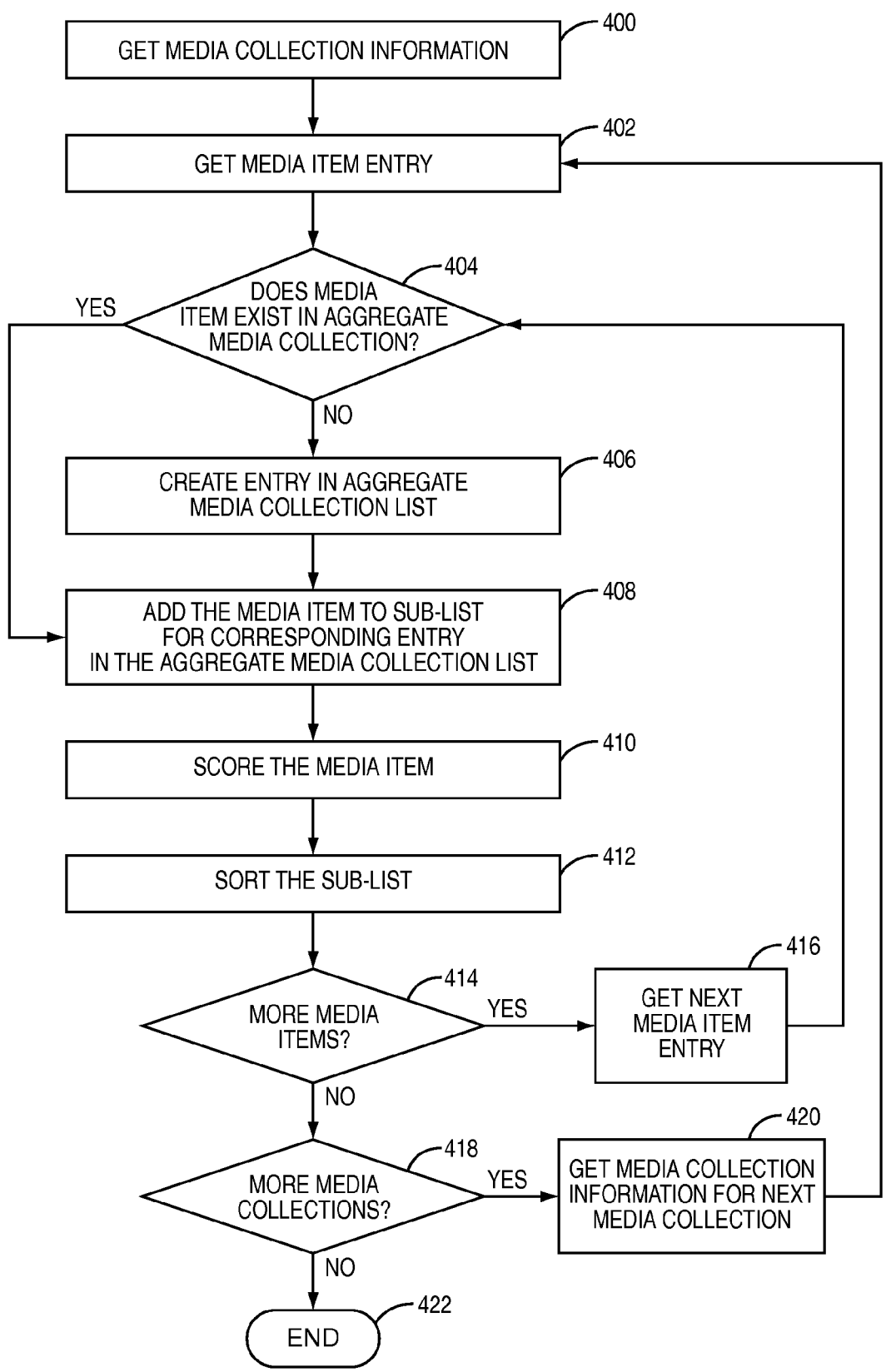
FIG. 5 is a flow chart illustrating a process for aggregating media collections according to one embodiment of the present invention.
Figure 6:
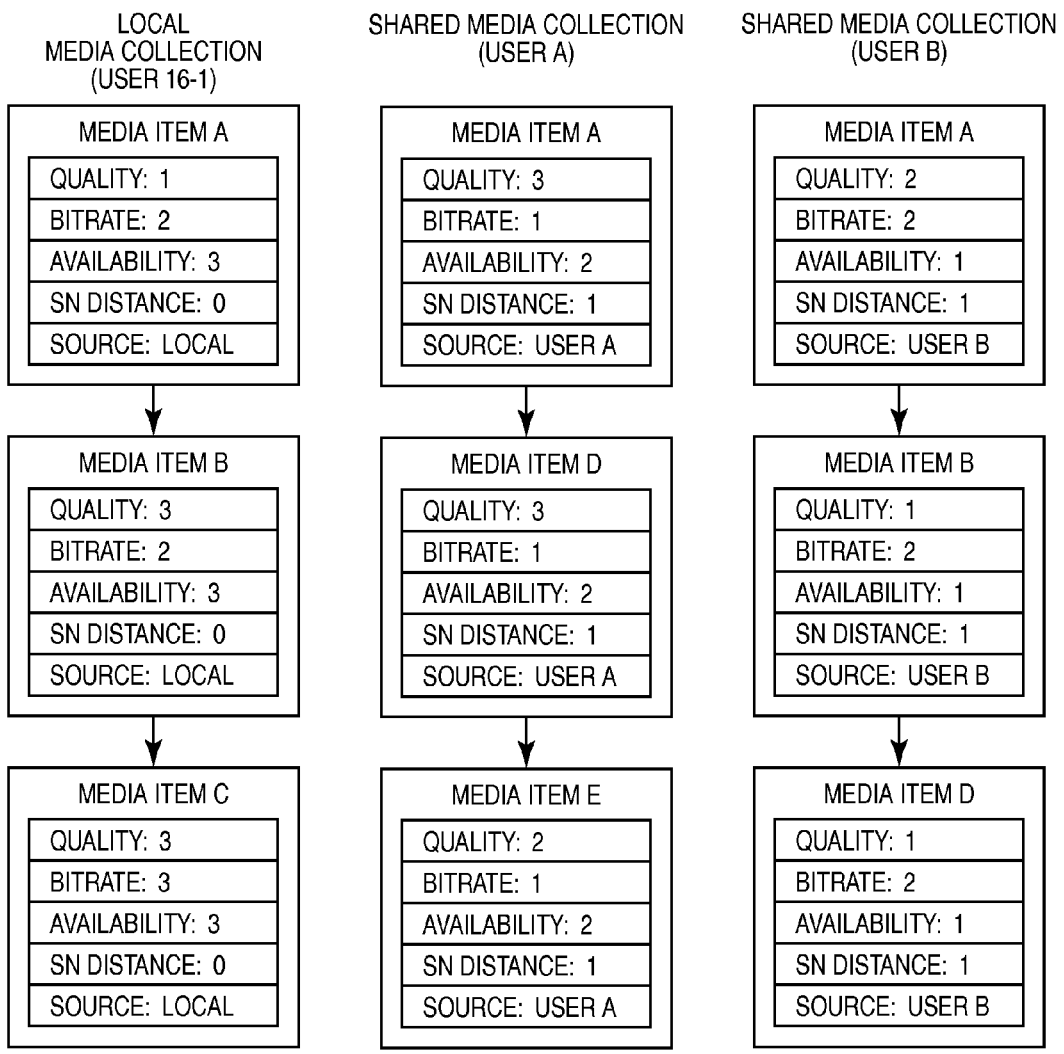
Figure 7:
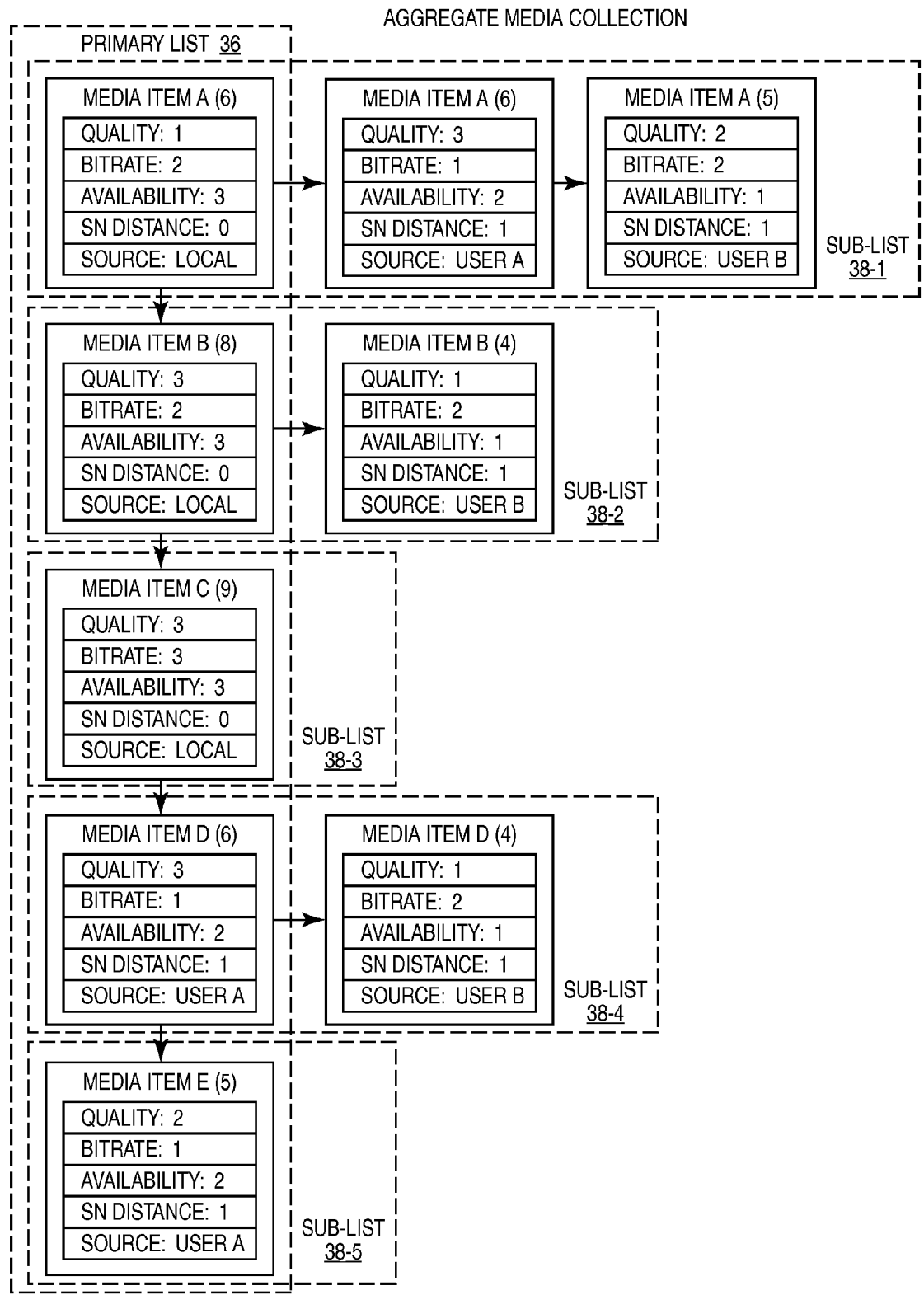
Figure 10:
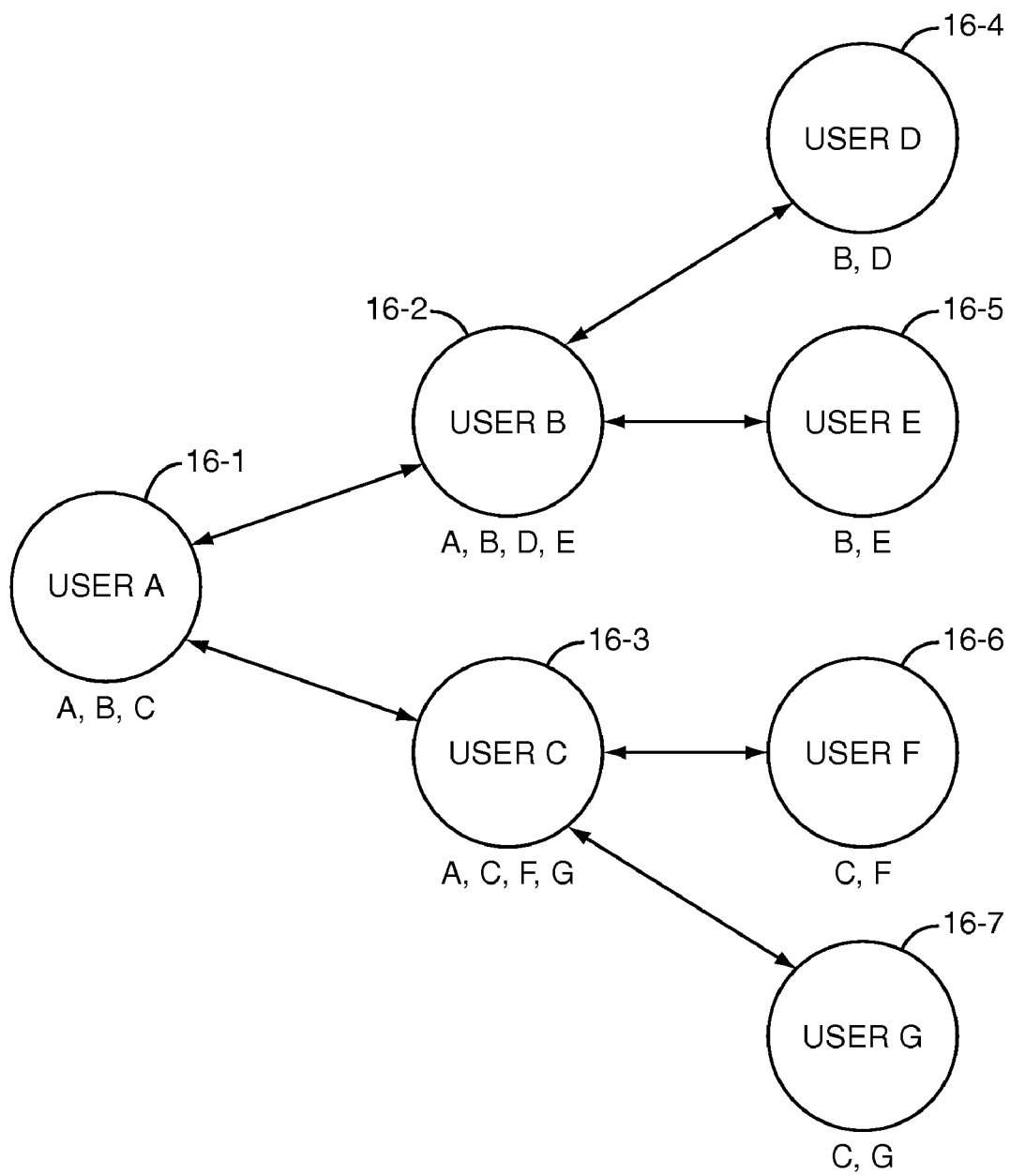
Figure 11:
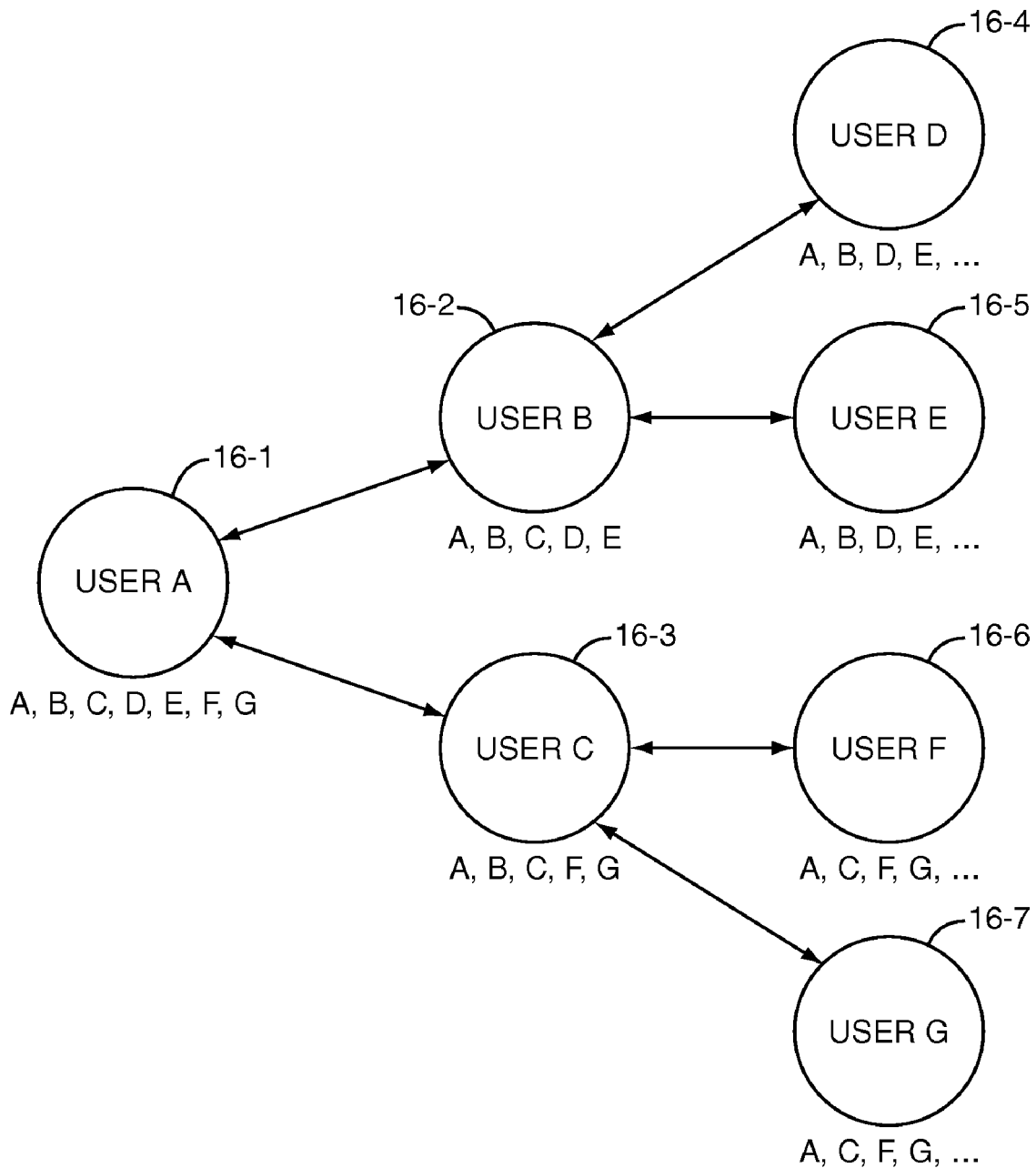
Figure 12:
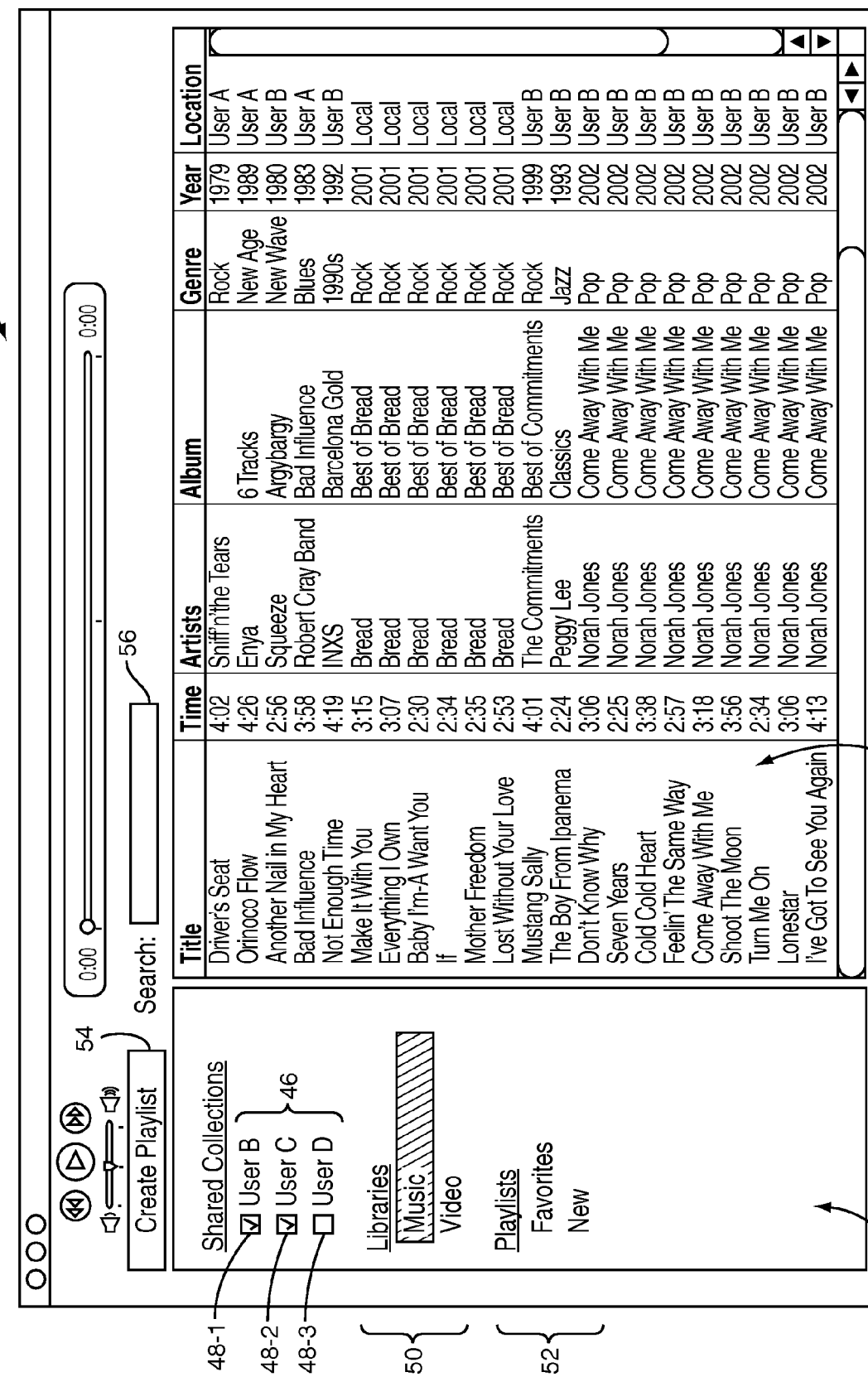
Figure 13:
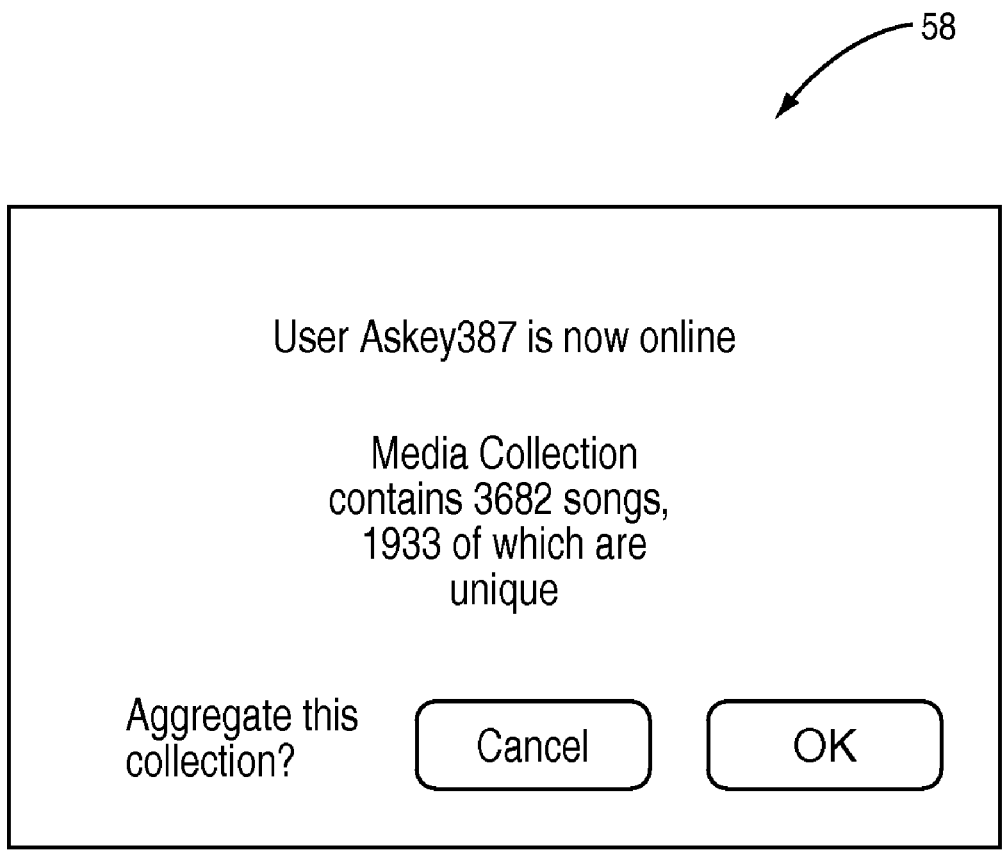
Figure 15:
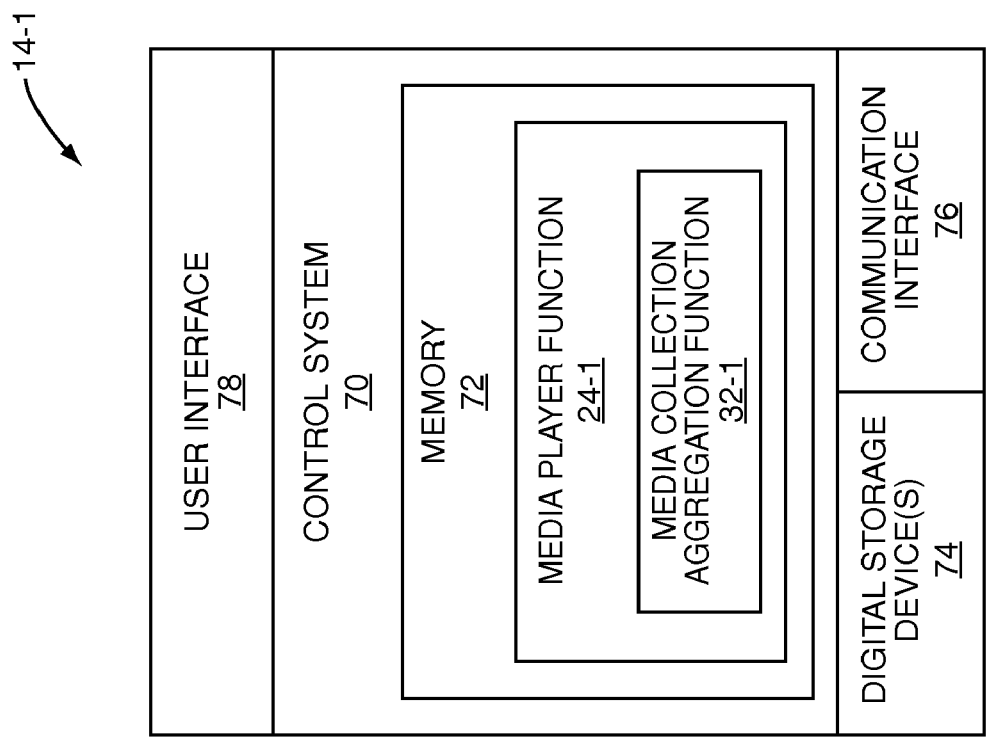
Figure 14:
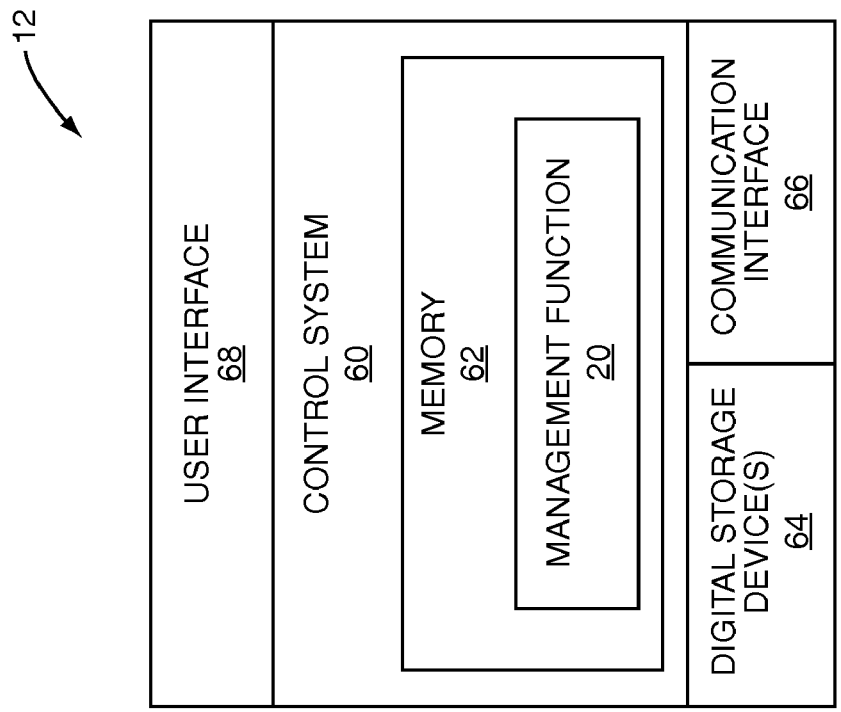

FIGS. 6 and 7 graphically illustrate the process of FIG. 5 for exemplary media collections according to one embodiment of the present invention;

FIG. 8 is a flow chart illustrating a process for filtering, or pruning, the aggregate media collection according to one embodiment of the present invention;

FIGS. 9A and 9B graphically illustrate the process of FIG. 8 for an exemplary aggregate media collection according to one embodiment of the present invention;

FIGS. 10 and 11 illustrate bridging of users to enable sharing of media collections between users having direct and indirect relationships in a social network according to one embodiment of the present invention;

FIG. 12 illustrates an exemplary Graphical User Interface (GUI) for presenting an aggregate media collection to a user and enabling the user to utilize the aggregate media collection according to one embodiment of the present invention;

FIG. 13 is an exemplary GUI for notifying a user of a new shared media collection and enabling the user to select whether to aggregate the new shared media collection according to one embodiment of the present invention;

FIG. 14 is a block diagram of an exemplary embodiment of the central server of FIG. 1; and FIG. 15 is a block diagram of an exemplary embodiment of one of the user devices of FIG. 1.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

FIG. 1 illustrates a system 10 in which media collections can be shared and aggregated with local media collections according to one embodiment of the present invention. In general, the system 10 includes a central server 12 and a number of user devices 14-1 through 14-N having associated users 16-1 through 16-N where both the central server 12 and the user devices 14-1 through 14-N are connected or enabled to connect to a network 18. The network 18 may be any type of Wide Area Network (WAN) or Local Area Network (LAN) and may include wired components, wireless components, or a combination of wired and wireless components. In one embodiment, the network 18 is the Internet.

As illustrated, the central server 12 is a single server. However, the central server 12 may be implemented as one or more physical servers. The central server 12 includes a management function 20 and a user accounts database 22. The management function 20 may be implemented in software, hardware, or a combination thereof. In general, the management function 20 operates to manage the user accounts database 22. In addition, the management function 20 may perform various functions with respect to the sharing and aggregation of media collections among the users 16-1 through 16-N. For example, as discussed below, in one embodiment, the management function 20 may operate to collect media collection information from each of the user devices 14-1 through 14-N. The media collection information generally includes information identifying media items in local media collections, or alternatively aggregate media collections, of the users 16-1 through 16-N. The media collection information for each of the users 16-1 through 16-N may be stored in corresponding user accounts in the user accounts database 22. The management function 20 may then provide the media collection information to the user devices 14-1 through 14-N to enable media collection sharing and aggregations according to one embodiment of the present invention.

The user accounts database 22 generally operates to store a user account for each of the users 16-1 through 16-N, or alternatively each of the user devices 14-1 through 14-N. In one embodiment, the users 16-1 through 16-N may be required to establish user accounts at the central server 12 via, for example, a subscription or registration process. Each user account may include, for example, the media collection information identifying the media items in the local media collection, or alternatively aggregate media collection, of the corresponding user from the users 16-1 through 16-N.

The user devices 14-1 through 14-N may each be any type of user device having networking and media playback capabilities. For example, each of the user devices 14-1 through 14-N may be a personal computer, a portable media player such as an Apple® iPod® media player, a mobile telecommunications device such as an Apple® iPhone, a set-top box, or the like. As illustrated with respect to the user device 14-1, the user device 14-1 includes a media player function 24-1, a local media collection 26-1, an aggregate media collection 28-1, and in one embodiment a friends list 30-1. In this exemplary embodiment, a media collection aggregation function 32-1 is embedded within the media player function 24-1. Note that while not illustrated for clarity, the other user devices 14-2 through 14-N include media player functions 24-2 through 24-N including media collection aggregation functions 32-2 through 32-N, local media collections 26-2 through 26-N, aggregate media collections 28-2 through 28-N, and optionally friends lists 30-2 through 30-N, respectively.

The media player function 24-1 may be implemented in software, hardware, or a combination thereof and generally operates to provide playback of media items from the local media collection 26-1 and the aggregate media collection 28-1. In this exemplary embodiment, the media collection aggregation function 32-1 is embedded within the media player function 24-1. However, the present invention is not limited thereto. The media collection aggregation function 32-1 may alternatively be implemented separately from the media player function 24-1. For example, the media collection aggregation function 32-1 may be implemented as a plug-in for the media player function 24-1.

As discussed below, the media collection aggregation function 32-1 generally operates to discover or identify one or more shared media collections available for aggregation with the local media collection 26-1 of the user 16-1. The shared media collections are either local or aggregate media collections of one or more other users from the users 16-2 through 16-N that have been shared with the user 16-1. Once the one or more shared media collections have been identified, the user 16-1 may optionally be enabled to select one or more of the shared media collections for aggregation with the local media collection 26-1 of the user 16-1. The media collection aggregation function 32-1 then operates to aggregate the selected shared media collections, or alternatively all of the shared media collections, to provide the aggregate media collection 28-1 of the user 16-1. The media player function 24-1 may then enable the user 16-1 to utilize the aggregate media collection 28-1. For example, a playlist may be created from the aggregate media collection 28-1 such that the playlist includes one or more media items from the local media collection 26-1 and one or more media items from the shared media collections. The media player function 24-1 then provides playback of the playlist or one or more media items from the playlist as directed by the user 16-1. In one embodiment, the one or more media items from the shared media collections may be streamed or downloaded from the corresponding user devices from the user devices 14-2 through 14-N as needed. In another embodiment, the one or more media items from the shared media collections may be prefetched from the corresponding user devices from the user devices 14-2 through 14-N.

The local media collection 26-1 includes a number of media items stored locally by the user device 14-1. These media items may include media items previously purchased by the user 16-1 from a remote media distribution service such as the Apple® iTunes® store or Real Network's Rhapsody® media distribution service. In addition or alternatively, the local media collection 26-1 may include media items imported from Compact Discs (CDs). As used herein, a media item may be, for example, an audio content item such as a song, audio book, or audio podcast; a video content item such as a movie, episode of a television program, or a video clip; or the like.

As discussed below, the aggregate media collection 28-1 preferably includes information representing an aggregate of the local media collection 26-1 of the user 16-1 and one or more of the local media collections 26-2 through 26-N, or alternatively one or more of the aggregate media collections 28-2 through 28-N, shared with and optionally selected by the user 16-1. More specifically, in one embodiment, the aggregate media collection 28-1 includes a primary list of unique media items in the local media collection 26-1 and the one or more shared media collections shared with and optionally selected by the user 16-1. In addition, for each media item in the primary list, a sub-list, or secondary list, including an entry for each occurrence of the media item in the local and shared media collections may be provided.

The friends list 30-1 is optional and may be used to store a list of identifiers, such as usernames, for each of a number of users from the users 16-2 through 16-N that have been identified as having a direct relationship with the user 16-1. Note that the friends list 30-1 may additionally or alternatively be stored in the user account of the user 16-1 at the central server 12. The friends list 30-1 may be a pre-existing list obtained from a social networking application such as, for example, a contact list of an email application, an instant messaging or chat application, a social networking website such as Facebook or MySpace, or the like. Alternatively, the friends list 30-1 may be a list of friends identified for the purpose of sharing and aggregating media collections. The friends list 30-1 may be used as a social network of the user 16-1. Further, if bridging is provided, the friends lists 30-1 through 30-N may be combined to create a social network providing direct and indirect relationships between the users 16-1 through 16-N.

Note that, in this embodiment, the user devices 14-1 and 14-2 are located within a subnetwork 34. For example, the user devices 14-1 and 14-2 may be connected to the network 18 via a common access point such as a LAN router. As discussed below, because the user devices 14-1 and 14-2 are located in the same subnetwork 34, the user devices 14-1 and 14-2 may automatically share their local media collections 26-1 and 26-2 or aggregate media collections 28-1 and 28-2 with one another, if sharing is enabled.

Figure 2:
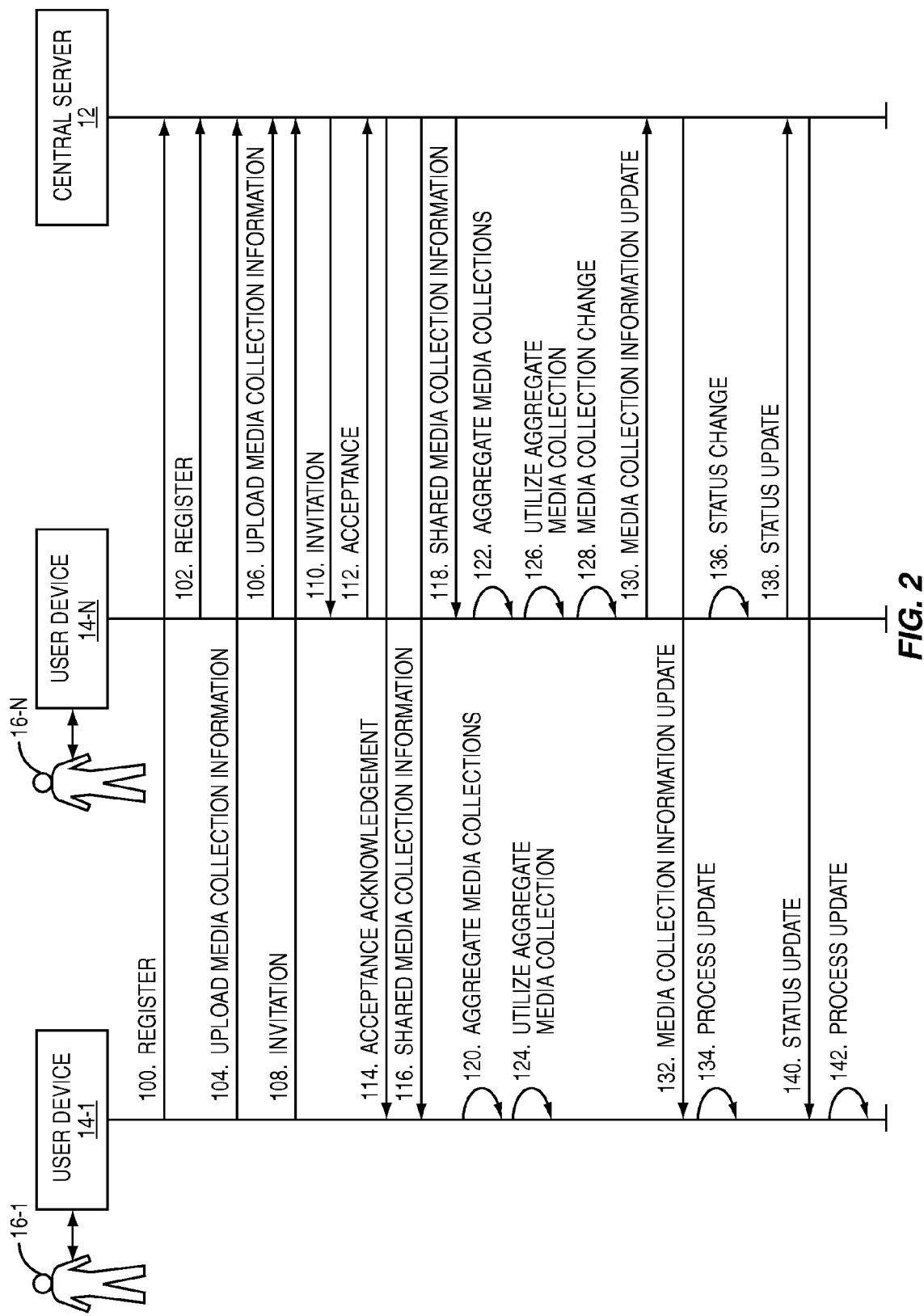
FIG. 2 illustrates the operation of the system of FIG. 1 according to a first embodiment of the present invention.

FIG. 2 illustrates the operation of the system 10 where two of the user devices 14-1 through 14-N share and aggregate their media collections according to a one embodiment of the present invention. First, in this example, user devices 14-1 and 14-N, or more specifically the users 16-1 and 16-N, register with the central server 12 (steps 100 and 102). Next, the user devices 14-1 and 14-N upload media collection information for their local media collections 26-1 and 26-N to the central server 12 (steps 104 and 106). The media collection information is stored as part of the user accounts of the corresponding users 16-1 and 16-N.

As discussed above, the media collection information of, for example, the local media collection 26-1 includes information identifying the media items in the local media collection 26-1. More specifically, the media collection information may include, for example, a Globally Unique Identifier (GUID) for each media item, a title and/or similar information identifying the media item, or the like. In addition, in one embodiment, the media collection information may also include information identifying a quality of the media item, information identifying a bitrate for the media item, information identifying an availability of the media item, or the like. The quality and bitrate may be encoding parameters used for encoding the media item. The availability of a media item may be determined based on historical information relating to the network connectivity of the corresponding user device. For example, if the user device 14-1 is frequently offline, then the availability of the media items in the local media collection 26-1 when shared with another user may be assigned a low value or a value indicating that the media items are frequently unavailable.

Next, in this embodiment, the user device 14-1 sends an invitation, or a request for an invitation, to the central server 12 to invite the user 16-N to share media collections (step 108). In the preferred embodiment, the user device 14-1 sends the invitation, or sends the request for the invitation, in response to input from the user 16-1. For example, the user 16-1 may enter or otherwise identify a username, an email address, or the like for the user 16-N and initiate the invitation. The central server 12 then sends the invitation to the user device 14-N of the user 16-N (step 110). In this example, the user 16-N accepts the invitation, and an acceptance message is returned to the central server 12 (step 112). The central server 12 then provides an acceptance acknowledgement message to the user device 14-1 (step 114). Note that upon receiving the acceptance acknowledgement message, the user device 14-1 may add the user 16-N to the friends list 30-1 of the user 16-1.

At this point, the central server 12 provides or enables download of the media collection information for the local media collection 26-N of the user 16-N to the user device 14-1 of the user 16-1 (step 116). The local media collection 26-N shared with the user 16-1 is also referred to herein as a shared media collection and, as such, the corresponding media collection information is also referred to herein as shared media collection information. Likewise, the central server 12 provides or enables download of the media collection information for the local media collection 26-1 of the user 16-1 to the user device 14-N of the user 16-N (step 118). Again, the local media collection 26-1 shared with the user 16-N is also referred to herein as a shared media collection and, as such, the corresponding media collection information is also referred to herein as shared media collection information.

The user device 14-1, and more specifically the media collection aggregation function 32-1, then operates to aggregate the local media collection 26-1 of the user 16-1 and the shared media collection of the user 16-N to provide the aggregate media collection 28-1 of the user 16-1 (step 120). In one embodiment, if sharing of the aggregate media collection 28-1 is desired, the user device 14-1 may send media collection information for the aggregate media collection 28-1 to the central server 12 for storage in the user account of the user 16-1. Thereafter, the media collection information for the aggregate media collection 28-1, rather than the media collection information for the local media collection 26-1, may be shared with other users.

Likewise, the user device 14-N, and more specifically the media collection aggregation function 32-N, then operates to aggregate the local media collection 26-N of the user 16-N and the shared media collection of the user 16-1 to provide the aggregate media collection 28-N of the user 16-N (step 122). In one embodiment, if sharing of the aggregate media collection 28-N is desired, the user device 14-N may send media collection information for the aggregate media collection 28-N to the central server 12 for storage in the user account of the user 16-N. Thereafter, the media collection information for the aggregate media collection 28-N, rather than the media collection information for the local media collection 26-N, may be shared with other users.

At this point, the user devices 14-1 and 14-N may utilize their aggregate media collections 28-1 and 28-N, respectively (steps 124 and 126). More specifically, at the user device 14-1, user-defined or system-defined playlists including media items from the aggregate media collection 28-1 may be generated and played. Note that for media items in the aggregate media collection 28-1 that are shared by the user 16-N, the media player function 24-1 may request streaming of those media items from the user device 14-N to the user device 14-1 directly or via the central server 12 as needed. Alternatively, the media player function 24-1 may request downloading of the shared media items from the user device 14-N directly or via the central server 12 as needed. Note that regardless of how the shared media items are delivered to the user device 14-1, Digital Rights Management (DRM) techniques may be used. In addition to or as an alternative to using the aggregate media collection 28-1 to generate playlists, the media player function 24-1 may enable the user 16-1 to perform other types of operations on the aggregate media collection 28-1 such as, for example, searches, sorting, or the like. The aggregate media collection 28-N may be used at the user device 14-N in a similar manner.

In this example, at some point after sharing and aggregating the local media collections 26-1 and 26-N of the users 16-1 and 16-N, a change occurs in the local media collection 26-N of the user 16-N (step 128). As an example, a new media item may be purchased or otherwise obtained by the user 16-N such that the new media item is added to the local media collection 26-N of the user 16-N. In response, the user device 14-N, and more specifically the media collection aggregation function 32-N, sends a media collection information update to the central server 12 (step 130). The central server 12 then updates the media collection information in the user account of the user 16-N, and sends the media collection information update to the user device 14-1 (step 132). In response, the media collection aggregation function 32-1 of the user device 14-1 processes the update such that the update is reflected in the aggregate media collection 28-1 of the user 16-1 (step 134).

Also in this example, at some point thereafter, a status of the user device 14-N changes (step 136). For example, the user device 14-N may disable sharing or go offline. In response to or in anticipation of such change, the user device 14-N provides a status update to the central server 12 (step 138). The central server 12 then forwards the status update to the user device 14-1 (step 140). Alternatively, the status change may be detected by the user device 14-1. In response, the user device 14-1, and more specifically the media collection aggregation function 32-1, processes the status update (step 142). For example, if the user 16-N has disabled sharing, the aggregate media collection 28-1 of the user 16-1 may be updated to remove entries for media items from the shared media collection of the user 16-N. As another example, if the user device 14-N goes offline, the aggregate media collection 28-1 may be updated to reflect that the media items shared by the user 16-N are not currently available or, alternatively, to remove entries for the media items shared by the user 16-N from the aggregate media collection 28-1.

Note that while FIG. 2 illustrates the operation of the system 10 where only one media collection is shared with each of the users 16-1 and 16-N, the present invention is not limited thereto. Multiple media collections may be shared with each of the users 16-1 through 16-N. For example, two or more of the local media collections 26-2 through 26-N may be shared with the user 16-1 and, as a result, be included in the aggregate media collection 28-1 of the user 16-1. Similarly, the local media collection 26-1 of the user 16-1 may be shared with two or more other users from the users 16-2 through 16-N.

Figure 3:
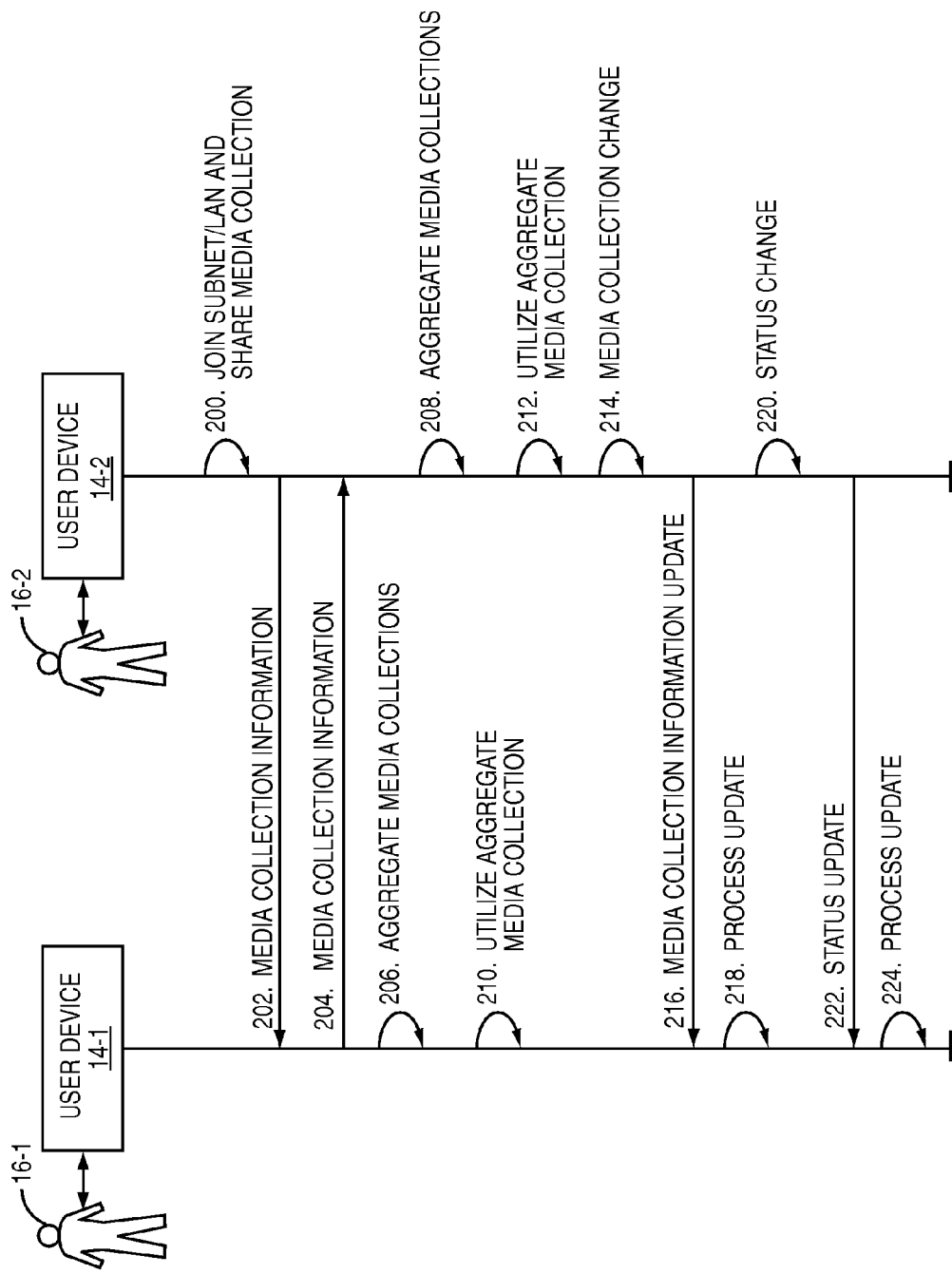
FIG. 3 illustrates the operation of the system of FIG. 1 according to a second embodiment of the present invention.

FIG. 3 illustrates the operation of the system 10 where two user devices 14-1 and 14-2 within the same subnetwork 34 share and aggregate their media collections according to one embodiment of the present invention. Note that the user devices 14-1 and 14-2 may alternatively share their media collections as discussed above with respect to FIG. 2 regardless of the fact that they are located within the same subnetwork 34.

First, the user device 14-2 joins the subnetwork 34 (step 200). For example, the user device 14-2 may join the subnetwork 34 by connecting to an access point through which the user devices 14-1 and 14-2 are both connected to the network 18. The access point may be, for example, a LAN router. Assuming that sharing of the local media collection 26-2 of the user 16-2 is enabled, the media collection information for the local media collection 26-2 of the user 16-2 is provided or made available for download to the user device 14-1 (step 202). Likewise, the media collection information for the local media collection 26-1 of the user 16-1 is provided or made available for download to the user device 14-2 (step 204). Note that the user devices 14-1 and 14-2 may automatically detect one another on the subnetwork 34 and, in response to such detection, automatically exchange their media collection information or make their media collection information available for download. The user device 14-1 may automatically detect the shared media collection of the user device 14-2 or automatically receive a notification of the shared media collection from the user device 14-2. Likewise, the user device 14-2 may automatically detect the shared media collection of the user device 14-1 or automatically receive a notification of the shared media collection from the user device 14-1.

The user device 14-1, and more specifically the media collection aggregation function 32-1, then operates to aggregate the local media collection 26-1 of the user 16-1 and the shared media collection of the user 16-2 to provide the aggregate media collection 28-1 of the user 16-1 (step 206). Likewise, the user device 14-2, and more specifically the media collection aggregation function 32-2, operates to aggregate the local media collection 26-2 of the user 16-2 and the shared media collection of the user 16-1 to provide the aggregate media collection 28-2 of the user 16-2 (step 208).

At this point, the user devices 14-1 and 14-2 may utilize their aggregate media collections 28-1 and 28-2, respectively (steps 210 and 212). More specifically, at the user device 14-1, user-defined or system-defined playlists including media items from the aggregate media collection 28-1 may be generated and played. Note that for media items in the aggregate media collection 28-1 that are shared by the user 16-2, the media player function 24-1 may request streaming of those media items from the user device 14-2 to the user device 14-1 as needed. Alternatively, the media player function 24-1 may request downloading of the shared media items from the user device 14-2 as needed. Note that regardless of how the shared media items are delivered to the user device 14-1, DRM techniques may be used. In addition to or as an alternative to using the aggregate media collection 28-1 to generate playlists, the media player function 24-1 may enable the user 16-1 to perform other types of operations on the aggregate media collection 28-1 such as, for example, searches, sorting, or the like. The aggregate media collection 28-2 may be used at the user device 14-2 in a similar manner.

In this example, at some point after sharing and aggregating the local media collections 26-1 and 26-2 of the users 16-1 and 16-2, a change occurs in the local media collection 26-2 of the user 16-2 (step 214). As an example, a new media item may be purchased or otherwise obtained by the user 16-2 such that the new media item is added to the local media collection 26-2 of the user 16-2. In response, the user device 14-2, and more specifically the media collection aggregation function 32-2, sends a media collection information update to the user device 14-1 (step 216). In response, the media collection aggregation function 32-1 of the user device 14-1 processes the update such that the update is reflected in the aggregate media collection 28-1 of the user 16-1 (step 218).

In this example, at some point thereafter, a status of the user device 14-2 changes (step 220). For example, the user device 14-2 may disable sharing, go offline, or exit the subnetwork 34. In response to or in anticipation of such change, the user device 14-2 provides a status update to the user device 14-1 (step 222). Alternatively, the status change may be detected by the user device 14-1. In response, the user device 14-1, and more specifically the media collection aggregation function 32-1, processes the status update (step 224). For example, if the user 16-2 has disabled sharing, the aggregate media collection 28-1 of the user 16-1 may be updated to remove entries for media items from the shared media collection of the user 16-2. As another example, if the user device 14-2 goes offline, the aggregate media collection 28-1 may be updated to reflect that the media items shared by the user 16-2 are currently unavailable or, alternatively, to remove entries for the media items shared by the user 16-2 from the aggregate media collection 28-1. As a final example, if the user device 14-2 exits the subnetwork 34 but still has a network connection, the user device 14-1, or alternatively the user device 14-2, may transfer management to the central server 12 (FIG. 1) such that sharing of the media collections between the two user devices 14-1 and 14-2 is managed as discussed above with respect to FIG. 2.

Note that while FIG. 3 illustrates the operation of the system 10 where only one media collection is shared with each of the users 16-1 and 16-2, the present invention is not limited thereto. Multiple media collections may be shared with each of the users 16-1 through 16-N. For example, the subnetwork 34 may include additional user devices sharing their media collections with other users in the subnetwork 34, including the users 16-1 and 16-2. As another example, in addition to the local media collection 26-2 of the user 16-2, one or more of the local media collections 26-3 through 26-N at the user devices 14-3 through 14-N outside of the subnetwork 34 may be shared with the user 16-1 and, as a result, be included in the aggregate media collection 28-1 of the user 16-1. Similarly, in addition to the user 16-2, the local media collection 26-1 of the user 16-1 may be shared with one or more other users from the users 16-3 through 16-N associated with the user devices 14-3 through 14-N that are outside of the subnetwork 34.

Figure 4:
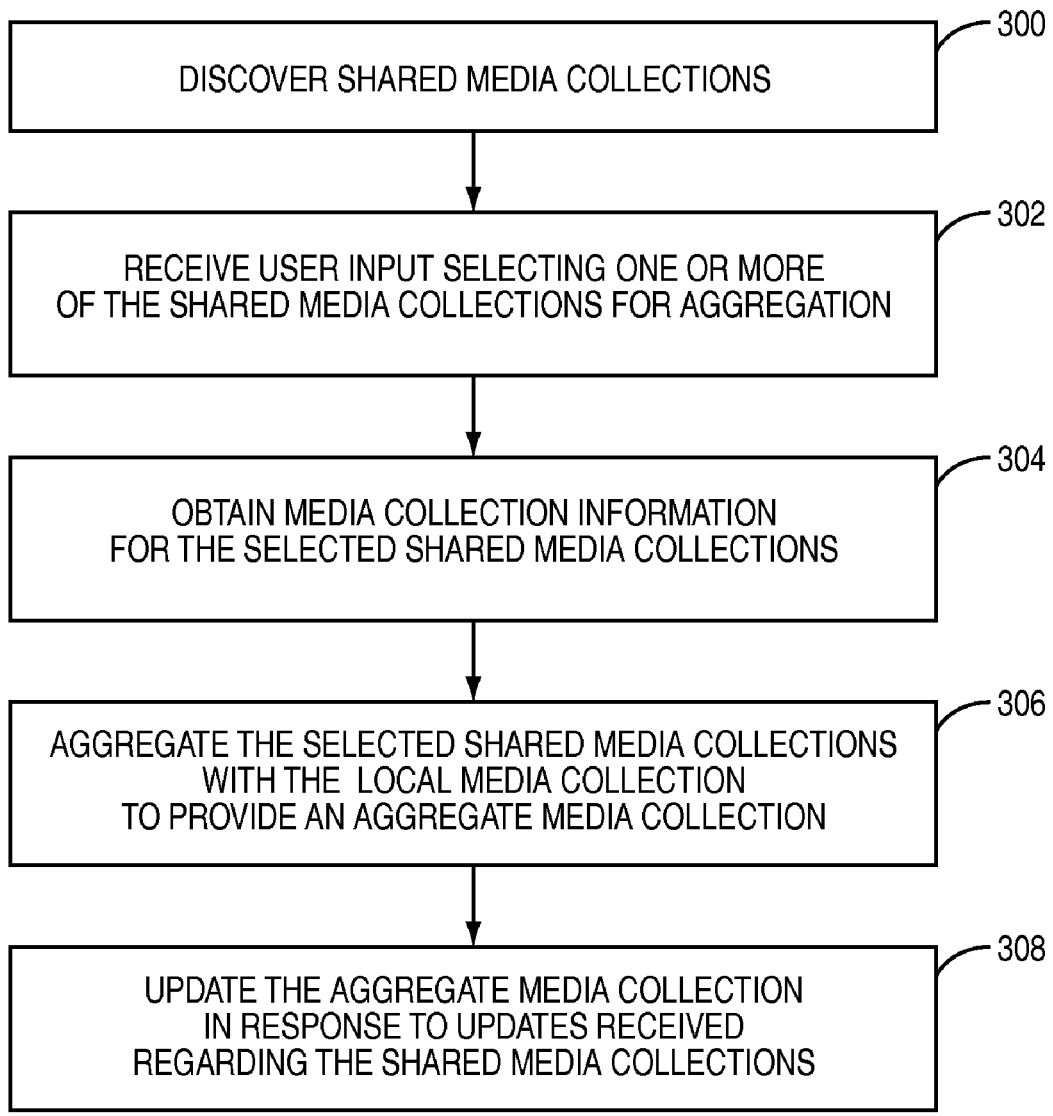
FIG. 4 is a flow chart illustrating the operation of the system of FIG. 1 according to a third embodiment of the present invention.

FIG. 4 provides a flow chart illustrating the operation of the media collection and aggregation function 32-1 according to another embodiment of the present invention where multiple media collections are shared with the user 16-1 and the user 16-1 is enabled to select one or more of the shared media collections for aggregation with the local media collection 26-1 to provide the aggregate media collection 28-1. First, the media collection aggregation function 32-1 discovers or otherwise identifies one or more shared media collections (step 300). The shared media collections are one or more of the local media collections 26-2 through 26-N of the other users 16-2 through 16-N that have been shared with the user 16-1. The shared media collections may be discovered via, for example, an invitation process as discussed with respect to FIG. 2 or automatically as a result of being stored by another user device within the subnetwork 34 of the user device 14-1.

Next, the media collection aggregation function 32-1 receives user input from the user 16-1 selecting one or more of the shared media collections for aggregation (step 302). More specifically, the media collection aggregation function 32-1 may enable the user 16-1 to select one or more of the shared media collections for aggregation via a user interface. In an alternative embodiment, user preferences, historical information, or the like may be utilized by the media collection aggregation function 32-1 to programmatically, or automatically, select or recommend selection of one or more of the shared media collections.

In this embodiment, the media collection aggregation function 32-1 then obtains the media collection information for the one or more shared media collections that have been selected for aggregation (step 304). The media collection information may be obtained from the central server 12, as discussed above. In an alternative embodiment, the media collection information may be obtained from the corresponding user devices from the user devices 14-2 through 14-N. In addition, while in this example the media collection information is obtained after selection of the one or more shared media collections for aggregation, the present invention is not limited thereto. The media collection information for the shared media collections may be obtained prior to selection of the one or more shared media collections for aggregation. If obtained before selection by the user 16-1, the shared media collection information may be used to assist the user 16-1 in the selection process.

Once the one or more shared media collections for aggregation have been selected and the corresponding shared media collection information has been obtained, the media collection aggregation function 32-1 aggregates the shared media collections and the local media collection 26-1 to provide the aggregate media collection 28-1 of the user 16-1 (step 306). Thereafter, the media collection aggregation function 32-1 may update the aggregate media collection 28-1 in response to updates received regarding the shared media collections (step 308). As discussed above, these updates may be media collection information updates, status updates, or the like.

FIG. 5 is a flow chart illustrating the operation of the media collection aggregation function 32-1 to aggregate the local media collection 26-1 and one or more shared media collections according to one embodiment of the present invention. This discussion is equally applicable to the other media collection aggregation functions 32-2 through 32-N. First, the media collection aggregation function 32-1 obtains, or gets, the media collection information for a first media collection (step 400). Next, the media collection aggregation function 32-1 obtains, or gets, a first media item entry from the media collection information (step 402). The media item entry includes information identifying the corresponding media item in the media collection such as, for example, the GUID, title, or similar information identifying the media item. In addition, the media item entry preferably includes information regarding a quality of the media item, a bitrate used to encode the media item, and an availability of the media item. Still further, the media item entry may include information identifying a source of the shared media item, such as information identifying the user device from the user devices 14-1 through 14-N on which the media item is stored or information identifying the corresponding user from the users 16-1 through 16-N. The media item entry may also include information identifying a logical distance between the user 16-1 and the user associated with the media item in a social network of the user 16-1, which may be desirable when bridging is provided in the manner discussed below.

Next, the media collection aggregation function 32-1 determines whether the media item identified by the media item entry already exists in the aggregate media collection 28-1 (step 404). In this embodiment, the aggregate media collection 28-1 is formed by a primary list including a media item entry for each unique media item in the aggregate media collection 28-1. In addition, the aggregate media collection 28-1 may include a sub-list for each media item entry in the primary list including an entry for each occurrence of the corresponding media item in the local media collection 26-1 and the one or more shared media collections. For example, if a particular media item is included in two shared media collections, the corresponding sub-list in the aggregate media collection 28-1 will include two entries for the media item where one entry corresponds to the media item shared in one of the shared media collections and the other entry corresponds to the media item shared in the other shared media collection.

If the media item identified by the media item entry in the shared media collection information is already included in the aggregate media collection 28-1, the process proceeds to step 408. Otherwise, the media collection aggregation function 32-1 creates a media item entry in the primary list for the aggregate media collection 28-1 for the media item identified by the media item entry from the shared media collection information (step 406). At this point, whether proceeding from step 404 or 406, a media item entry is created in the appropriate sub-list for the particular copy of the media item shared in the shared media collection currently being processed (step 408).

Next, the media item in the media collection currently being processed is scored in order to determine which media item entry from the sub-list for the media item is to be referenced or included in the primary list for the aggregate media collection 28-1 (step 410). More specifically, in one embodiment, the media item identified by the media item entry in the sub-list is scored based on quality, bitrate, availability, or the like. Then, based on the scores of the media item entries in the sub-list for the media item, the sub-list is sorted (step 412). The media item entry in the sorted sub-list having the highest score is then used as the media item entry for the corresponding media item in the primary list for the aggregate media collection 28-1.

The media collection aggregation function 32-1 then determines whether there are more media item entries in the media collection information (step 414). If so, the media collection aggregation function 32-1 obtains, or gets, the next media item entry (step 416) and returns to step 404. The process is repeated until the last media item entry in the media collection information is processed. Once the last media item entry is processed, the media collection aggregation function 32-1 determines whether there are more media collections to aggregate (step 418). If so, the media collection aggregation function 32-1 obtains, or gets, the media collection information for the next media collection (step 420) and returns to step 402. The process is repeated until the last media collection of the local and shared media collections is aggregated to provide the aggregate media collection 28-1 of the user 16-1. Once the last media collection is aggregated, the process ends (step 422).

FIGS. 6 and 7 graphically illustrate the process of FIG. 5 to aggregate the local media collection 26-1 of the user 16-1 and two shared media collections according to one embodiment of the present invention. FIG. 6 illustrates media collection information for the local media collection 26-1 of the user 16-1 and media collection information for shared media collections shared with the user 16-1 by users A and B, respectively. The users A and B may be any two users from the users 16-2 through 16-N. In this example, the local media collection 26-1 of the user 16-1 includes media items A, B, and C, the shared media collection of user A includes media items A, D, and E, and the shared media collection of user B includes media items A, B, and D. For each media item, the media collection information includes an identifier of the media item (MEDIA ITEM X), information identifying a quality of the media item, information identifying a bitrate used when encoding the media item, information regarding the availability of the media item, optionally information reflecting a social network (SN) distance between the user and the source of the media item in a social network, and information identifying a source of the media item.

FIG. 7 illustrates the aggregate media collection 28-1 resulting from the aggregation of the local media collection 26-1 and the two shared media collections of FIG. 6 according to one embodiment of the present invention. As illustrated, the aggregate media collection 28-1 is formed, or represented by, a primary list 36 including a media item entry for each unique media item in the aggregate media collection 28-1. Sub-lists 38-1 through 38-5 include a media item entry for each occurrence of the corresponding unique media items in the aggregate media collection 28-1. Thus, in this example, since media item A is included in the local media collection 26-1 and each of the shared media collections, the sub-list 38-1 includes three media item entries, each of which corresponds, or represents, one of the occurrences of media item A. Likewise, the sub-lists 38-2 through 38-5 are provided for the remaining media item entries in the primary list 36. The media items represented by the media item entries in the sub-lists 38-1 through 38-5 are scored based on quality, bitrate, and availability. Then, based on the scores, the sub-lists 38-1 through 38-5 are sorted such that, for each of the sub-lists 38-1 through 38-5, the media item entry representing the media item having the highest score is utilized as or referenced by the corresponding media item entry in the primary list 36.

As the number of media items in the shared media collections increases and/or as the number of shared media collections increases, the number of media items in the aggregate media collection 28-1 may become large. FIG. 8 is a flow chart for pruning, or filtering, the aggregate media collection 28-1 based on user preferences of the user 16-1 according to one embodiment of the present invention. First, the media items in the aggregate media collection 28-1 of the user 16-1 are scored based on user preferences to provide desirability scores for the media items (step 500). For example, the user preferences may be defined by weights assigned to one or more music genres, one or more music artists, one or more decades (e.g., 1950s, 1960s, . . . ), one or more movie or television program genres, one or more actors or actresses, one or more users sharing the shared media collections, or the like. The weights may be assigned by the user 16-1 or programmatically set based on the local media collection of the user 16-1 and/or historical information regarding, for example, media items previously played by the user 16-1. If programmatically set, the weights may thereafter be adjusted manually by the user 16-1. For an exemplary process for scoring media items based on user preferences, the interested reader is directed to U.S. Patent Application Publication No. 2008/0016205 A1, entitled P2P NETWORK FOR PROVIDING REAL TIME MEDIA RECOMMENDATIONS, which was filed Jul. 11, 2006 and is hereby incorporated herein by reference in its entirety.

Next, the aggregate media collection 28-1 is filtered based on the desirability scores for the media items and a filtering, or pruning, threshold to provide a filtered, or pruned, version of the aggregate media collection 28-1 (step 502). More specifically, in one embodiment, media items in the aggregate media collection 28-1 having desirability scores less than the filtering threshold are removed to provide the filtered version of the aggregate media collection 28-1. In one embodiment, the filtering threshold is set by the user 16-1.

FIGS. 9A and 9B graphically illustrate the filtering, or pruning, of an exemplary aggregate media collection 28-1 according to one embodiment of the present invention. FIG. 9A illustrates the media items in the aggregate media collection 28-1 and desirability scores for those media items. FIG. 9B illustrates a filtered version of the aggregate media collection 28-1' after filtering using a filtering threshold of fifty (50).

The discussion above has primarily focused on sharing media collections between users having a direct relationship. However, the present invention is not limited thereto. Media collections may be shared with users having direct and indirect relationships. More specifically, FIG. 10 illustrates an embodiment where bridging relationships between users is not provided according to one embodiment of the present invention. As such, the aggregate media collection 28-1 of the user 16-1 (user A) includes the shared media collections of the users 16-2 and 16-3 (users B and C) with which the user 16-1 (user A) has a direct relationship. These direct relationships may be reflected in the friends list 30-1 of the user 16-1 (user A). However, the user 16-1 (user A) does not have a direct relationship with the users 16-4 through 16-7 (users D through G). Thus, more specifically, the aggregate media collection 28-1 of the user 16-1 (user A) includes media items from the local media collection 26-1 of the user 16-1 (user A), media items from the local media collection 26-2 of the user 16-2 (user B), and media items from the local media collection 26-3 of the user 16-3 (user C). The aggregate media collection 28-1 of the user 16-1 (user A) does not include the local media collections 26-4 through 26-7 of the users 16-4 through 16-7 (users D through G).

In contrast, the user 16-2 (user B) has direct relationships with users 16-1, 16-4, and 16-5 (users A, D and E), but does not have a direct relationship with the users 16-3, 16-6, and 16-7 (users C, F, and G). As such, the aggregate media collection 28-2 of the user 16-2 (user B) includes the media items from the local media collection 26-2 of the user 16-2 (user B) as well as the media items from the local media collections 26-1, 26-4, and 26-5 of the users 16-1, 16-4, and 16-5 (users A, D, and E), but does not include the media items from the local media collections 26-3, 26-6, and 26-7 of the users 16-3, 16-6, and 16-7 (users C, F, and G). Likewise, the user 16-3 (user C) has direct relationships with users 16-1, 16-6, and 16-7 (users A, F and G), but does not have a direct relationship with the users 16-2, 16-4, and 16-5 (users B, D, and E). As such, the aggregate media collection 28-3 of the user 16-3 (user C) includes the media items from the local media collection 26-3 of the user 16-3 (user C) as well as the media items from the local media collections 26-1, 26-6, and 26-7 of the users 16-1, 16-6, and 16-7 (users A, F, and G), but does not include the media items from the local media collections 26-2, 26-4, and 26-5 of the users 16-2, 16-4, and 16-5 (users B, D, and E).

Similarly, the aggregate media collection 28-4 of the user 16-4 (user D) includes the media items from the local media collection 26-4 of the user 16-4 (user D) as well as the media items from the local media collection 26-2 of the user 16-2 (user B). Likewise, the aggregate media collection 28-5 of the user 16-5 (user E) includes the media items from the local media collection 26-5 of the user 16-5 (user E) as well as the media items from the local media collection 26-2 of the user 16-2 (user B). The aggregate media collection 28-6 of the user 16-6 (user F) includes the media items from the local media collection 26-6 of the user 16-6 (user F) as well as the media items from the local media collection 26-3 of the user 16-3 (user C). Likewise, the aggregate media collection 28-7 of the user 16-7 (user G) includes the media items from the local media collection 26-7 of the user 16-7 (user G) as well as the media items from the local media collection 26-3 of the user 16-3 (user C).

FIG. 11 illustrates an embodiment where bridging relationships between users is provided according to one embodiment of the present invention. For this example, it is assumed that bridging is performed for users within two degrees of separation, or "hops," within a social network. For example, the social network may be provided based on the friends lists 30-1 through 30-N of the users 16-1 through 16-N (FIG. 1). Through the social network, users have direct relationships to their own friends (one degree of separation in the social network), indirect relationships with friends of friends (two degrees of separation in the social network), etc.

As such, the aggregate media collection 28-1 of the user 16-1 (user A) includes media items from the local media collections 26-2 and 26-3 of the users 16-2 and 16-3 (users B and C) with which the user 16-1 (user A) has a direct relationship and media items from the local media collections 26-4 through 26-7 of the users 16-4 through 16-7 (users E through G) with which the user 16-1 (user A) has indirect relationships within two degrees of separation. In contrast, the user 16-2 (user B) does not have indirect relationships within two degrees of separation with the users 16-6 and 16-7 (users F and G). As a result, the aggregate media collection 28-2 of the user 16-2 (user B) includes the media items from the local media collection 26-2 of the user 16-2 (user B) as well as the media items from the local media collections 26-1, 26-3, 26-4, and 26-5 of the users 16-1, 16-3, 16-4, and 16-5 (users A, C, D, and E). However, since the users 16-6 and 16-7 (users F and G) are not within two degrees of separation from the user 16-2 (user B) in the social network, the aggregate media collection 28-2 of the user 16-2 (user B) does not include the media items from the local media collections 26-6 and 26-7 of the users 16-6 and 16-7 (users F and G).

Likewise, the aggregate media collection 28-3 of the user 16-3 (user C) includes the media items from the local media collection 26-3 of the user 16-3 (user C) as well as the media items from the local media collections 26-1, 26-2, 26-6, and 26-7 of the users 16-1, 16-2, 16-6, and 16-7 (users A, B, F, and G). However, since the users 16-4 and 16-5 (users D and E) are not within two degrees of separation from the user 16-3 (user C) in the social network, the aggregate media collection 28-3 of the user 16-3 (user C) does not include the local media collections 26-4 and 26-5 of the users 16-4 and 16-5 (users D and E). The aggregate media collections 28-4 through 28-7 of the users 16-4 through 16-7 (users D through G) are formed by media items in the local media collections of other users within two degrees of separation in the social network in a similar fashion.

In operation, bridging users to enable sharing of media collections between users having direct and indirect relationships in the manner described above may be performed using various schemes. In one embodiment, the shared media collections may the aggregate media collections of the sharing users. Thus, using FIG. 11 as an example, the users 16-2 and 16-3 (users B and C) share their aggregate media collections 28-2 and 28-3 with the user 16-1 (user A) as well as the users 16-4 and 16-5 (users D and E) and users 16-6 and 16-7 (users F and G), respectively. The other users share their aggregate media collections to their direct friends in a similar manner.

With respect to aggregation, using the user 16-1 (user A) as an example, the media collection aggregation function 32-1 (FIG. 1) of the user device 14-1 of the user 16-1 aggregates the shared aggregate media collections of the users 16-2 and 16-3 (users B and C) with the local media collection 26-1 to provide the aggregate media collection 28-1 of the user 16-1 (user A). However, when aggregating, only media items from local media collections of other users within the threshold social network distance from the user 16-1 (user A) are aggregated. Note that the social network distance between the user 16-1 (user A) and the source of the media items may be reflected in the corresponding media item entries in the shared media collection information. Thus, if the threshold social network distance were two degrees of separation, then aggregation at the user device 14-1 would discard any media items from local media collections of users beyond the users 16-4 through 16-7 (users D through G).

In another embodiment, the central server 12 (FIG. 1) may identify other users within the threshold social network distance from a user and then provide or enable downloading of the media collection information for the local media collections of the desired users. Again, using the user 16-1 (user A) of FIG. 11 as an example, assuming that the threshold social network distance is two degrees of separation, the central server 12 may identify the users 16-2 through 16-7 (users B through G) as being within two degrees of separation of the user 16-1 (user A) in the social network. As such, the central server 12 then provides or enables download of the media collection information for the local media collections 26-2 through 26-7 to the user device 14-1 of the user 16-1 (user A) for aggregation.

FIG. 12 illustrates an exemplary Graphical User Interface (GUI) 40 enabling a user to select shared media items for aggregation and further enabling the user to utilize the resulting aggregate media collection according to one embodiment of the present invention. As illustrated, the GUI 40 generally includes a navigation area 42 and a display area 44. In this example, the navigation area 42 includes a shared collections section 46 for displaying identifiers of a number of shared media collections that are shared with the user. In this example, the identifiers are usernames of other users (user B, user C, and user D) that have shared their media collections with the user. Check boxes 48-1, 48-2, and 48-3 are presented in association with the identifiers of the shared media collections and enable the user to select one or more of the shared media collections to aggregate with the user's local media collection. In this example, the user has selected the shared media collections of users B and C for aggregation with the user's own local media collection.

In this example, the navigation area 42 also includes a libraries section 50 enabling the user to select one of a number of libraries to present in the display area 44 if desired. In this example, the user has selected the "music" library. As such, the aggregate music collection of the user, which has been generated by aggregating the local music collection of the user and the shared music collections of the users B and C, is presented in the display area 44. In a similar manner, the user may select the "video" library. As a result, the aggregate video collection of the user may be presented in the display area 44. Note that in an alternative embodiment, the user may additionally or alternatively be enabled to display the aggregate media collection including both music and videos from the local media collection of the user and the shared media collections of the users B and C.

The navigation area 42 may also include a playlists section 52 including identifiers of a number of playlists. The playlists may be system-defined or user-defined playlists. Further, the playlists may include media items from the aggregate media collection of the user. As such, the playlists may include media items from the local media collection of the user and/or media items from the shared media collections of the users B and C. In addition, the playlists may include media items from the shared media collection of the user C and/or media items from media collections previously shared with the user. When a playlist identifier is selected by the user, the corresponding playlist is presented in the display area 44. The user may then navigate through the playlist and cause playback of the playlist or select media items from the playlist, as will be appreciated by one of ordinary skill in the art upon reading this disclosure.

Note that for playlists including media items from a shared playlist that is not currently selected by the user or from shared media collections that are currently unavailable, the playlists may identify those media items as being unavailable. Further, the user may be notified when all media items in a playlist are currently available from the selected shared media collections or all shared media collections that are currently available. In a similar manner, the GUI 40 may include an indication for each playlist regarding the number or percentage of media items in the playlist that are or are not currently available. In addition, the playlists may be ranked or sorted based on the number or percentage of media items in the playlists that are or are not currently available.

The GUI 40 may also include a "create playlist" button 54. When activated by the user, the "create playlist" button 54 enables the user to define a new playlist using any known playlist creation technique. However, again, media items from the local media collection and/or media items from the shared media collections may be included in the new playlist. The GUI 40 may also include a search field 56. The search field 56 enables the user to search the aggregate media collection for desired media items. More specifically, in this example, the search field 56 may enable the user to search the aggregate music collection, the aggregate video collection, both the aggregate music collection and the aggregate video collection, a selected shared media collection, or all shared media collections for desired media items.

FIG. 13 illustrates another exemplary GUI 58 for providing notification to the user when another user's shared media collection becomes available according to one embodiment of the present invention. The GUI 58 may be used in conjunction with the GUI 40 of FIG. 12. In general, the notification provided by the GUI 58 includes information to assist the user in determining whether to select the shared media collection for aggregation. More specifically, in this example, the notification includes a total number of media items in the shared media collection and a number of those media items that are unique or new as compared to the current aggregate media collection of the user. If an aggregate media collection has not yet been created, then the number of unique or new media items is determined as compared to the user's local media collection.

In one embodiment, the notification provided by the GUI 58 of FIG. 13 is generated by a user device, such as, for example, the user device 14-1. The user device 14-1 may generate the notification upon detecting or being notified that a new shared media collection exists in the subnetwork 34 and/or upon detecting or being notified that another user with which the user has a direct or indirect relationship has come online. At that point, the user device 14-1 may obtain the corresponding shared media collection information and compare the shared media collection information to the media collection information of the aggregate media collection 28-1, or alternatively the media collection information for the local media collection 26-1, to generate the notification. Alternatively, the notification may be triggered by the central server 12 (FIG. 1). In response to the notification, the user 16-1 may select whether to not to aggregate the shared media collection.

FIG. 14 is a block diagram of an exemplary embodiment of the central server 12 of FIG. 1. In general, the central server 12 includes a control system 60 having associated memory 62. In this embodiment, the management function 20 is implemented in software and stored in the memory 62. However, the present invention is not limited thereto. The management function 20 may be implemented in software, hardware, or a combination thereof. The central server 12 also includes one or more digital storage devices 64, such as one or more hard disk drives or the like. The user accounts database 22 (FIG. 1) may be stored in the one or more digital storage devices 64. The central server 12 also includes a communication interface 66 communicatively coupling the central server 12 to the network 18 (FIG. 1). Lastly, the central server 12 may include a user interface 68, which may include components such as, for example, a display and one or more user input devices.

FIG. 15 is a block diagram of an exemplary embodiment of the user device 14-1 of FIG. 1. This discussion is equally applicable to the other user devices 14-2 through 14-N. In general, the user device 14-1 includes a control system 70 having associated memory 72. In this embodiment, the media player function 24-1, including the media collection aggregation function 32-1, is implemented in software and stored in the memory 72. However, the present invention is not limited thereto. The media player function 24-1, including the media collection aggregation function 32-1, may be implemented in software, hardware, or a combination thereof. The user device 14-1 may also include one or more digital storage devices 74 such as, for example, one or more hard disk drives, one or more removable memory devices, or the like. In one embodiment, the local media collection 26-1, the aggregate media collection 28-1, and the friends list 30-1 are stored in the one or more digital storage devices 74. However, one or more of the local media collection 26-1, the aggregate media collection 28-1, and the friends list 30-1, or any portion thereof, may alternatively be stored in the memory 72. The user device 14-1 also includes a communication interface 76 communicatively coupling the user device 14-1 to the network 18 (FIG. 1). Lastly, the user device 14-1 includes a user interface 78, which may include components such as a display, one or more user input devices, a speaker, and the like.

The system and methods discussed herein provide substantial opportunity for variation without departing from the scope of the present invention. For example, while the system 10 of FIG. 1 utilizes a central server 12, the present invention is not limited thereto. All or a portion of the functionality of the central server 12 may be distributed among one or more of the user devices 14-1 through 14-N. As another example, while discovery of shared media collections is discussed above as being performed using an invitation process or auto-detection process, the present invention is not limited thereto. For example, media collections to be shared with the user 16-1 may be identified based on media items not within the local media collection 26-1 of the user 16-1 in which the user 16-1 has expressed an interest. More specifically, as an example, the user 16-1 may create a playlist of media items including media items not included in the local media collection 26-1 of the user 16-1. In response, the user device 14-1 may send a request to the central server 12 identifying the media items needed by the user 16-1 for the playlist. The central server 12 may then analyze the media collection information for the other users 16-2 through 16-N to identify one or more shared media collections that, if shared with the user 16-1, would provide the user 16-1 access to the needed media items for the playlist. The central server 12 preferably identifies the least number of shared media collections needed to provide the needed media items. The identified media collections may then be shared with the user 16-1.

Those skilled in the art will recognize improvements and modifications to the preferred embodiments of the present invention. All such improvements and modifications are considered within the scope of the concepts disclosed herein and the claims that follow.

What is claimed is:

1. A method comprising:
   discovering, by a first user device, a plurality of shared media collections made available to a first user of the first user device by a plurality of second users of a plurality of second user devices, wherein media items in the plurality of shared media collections comprise at least one media item from a local media collection of a user having a direct relationship with the first user in a social network and at least one media item from a local media collection of a user having an indirect relationship with the first user in the social network;

aggregating, by the first user device, one or more shared media collections from the plurality of shared media collections and the local media collection of the first user to provide an aggregate media collection for the first user at the first user device;

enabling the first user to utilize the aggregate media collection at the first user device;

scoring media items in the aggregate media collection based on user preferences of the first user to provide a desirability score for each of the media items; and filtering the aggregate media collection based on a threshold score and the desirability scores for the media items in the aggregate media collection to provide a filtered version of the aggregate media collection.

2. The method of claim 1 wherein the plurality of second users are users having a direct relationship with the first user in the social network, the plurality of shared media collections are a plurality of shared aggregate media collections of the plurality of second users, and aggregating, at the first device, the one or more shared media collections and the local media collection of the first user comprises:

aggregating media items from the plurality of shared aggregate media collections that are from local media collections of other users within a predetermined distance from the first user in the social network and media items from the local media collection of the first user to provide the aggregate media collection of the first user.

3. The method of claim 1 wherein the plurality of shared media collections are local media collections of the plurality of second users, and the plurality of second users are users identified as being within a predetermined logical distance from the first user in the social network.

4. The method of claim 1 wherein the plurality of second users are users identified by a central server as being within a predetermined logical distance from the first user in the social network, and further comprising:

for each shared media collection of the one or more shared media collections selected by the first user, obtaining media collection information from the central server identifying media items in the shared media collection;

further wherein aggregating the one or more shared media collections and the local media collection of the first user comprises aggregating the one or more shared media collections and the local media collection of the first user based on the media collection information obtained from the central server for each of the one or more shared media collections.

5. The method of claim 1 wherein the plurality of second users are users identified by a central server as being within a predetermined logical distance from the first user in the social network, and further comprising:

for each media collection of the plurality of shared media collections, obtaining media collection information from the central server identifying media items in the shared media collection;

further wherein aggregating the one or more shared media collections selected by the first user and the local media collection of the first user comprises aggregating the one or more shared media collections and the local media collection of the first user based on the media collection information obtained from the central server for each of the one or more shared media collections.

6. The method of claim 1 wherein enabling the first user to utilize the aggregate media collection at the first user device comprises:

enabling the first user to create a playlist including a plurality of media items from the aggregate media collection; and causing playback of one or more of the plurality of media items from the playlist as directed by the first user.

7. The method of claim 6 wherein causing playback of the one or more of the plurality of media items from the playlist comprises:

for each media item from the one or more of the plurality of media items in the playlist that is not included in the local media collection of the first user, obtaining the media item from a corresponding second user device of the plurality of second user devices that is sharing the media item.

8. The method of claim 1 wherein enabling the first user to utilize the aggregate media collection at the first user device comprises:

enabling the first user to initiate a search of the aggregate media collection; and returning results of the search to the first user.

9. The method of claim 1 further comprising sharing, by the first user device, of the local media collection of the first user with the plurality of second user devices of the plurality of second users.

10. The method of claim 1 further comprising, for each shared media collection from the one or more shared media collections, obtaining media collection information identifying media items in the shared media collection, wherein aggregating the one or more shared media collections selected by the first user and the local media collection of the first user comprises aggregating the media collection information for the one or more shared media collections and media collection information for the local media collection of the first user to provide the aggregate media collection.

11. The method of claim 1 further comprising, for each shared media collection from the plurality of shared media collections, obtaining media collection information identifying media items in the shared media collection, wherein aggregating the one or more shared media collections selected by the first user and the local media collection of the first user comprises aggregating the media collection information for the one or more shared media collections and media collection information for the local media collection of the first user to provide the aggregate media collection.

12. The method of claim 1 wherein aggregating the one or more shared media collections and the local media collection of the first user comprises processing media collection information identifying media items in the local media collection and media collection information identifying media items in the one or more shared media collections to provide a primary list including a media item entry for each unique media item.

13. The method of claim 12 wherein aggregating the one or more shared media collections and the local media collection of the first user further comprises processing the media collection information identifying the media items in the local media collection and the media collection information identifying the media items in the one or more shared media collections to further provide a sub-list for each media item entry in the primary list, the sub-list comprising a media item entry for each occurrence of the corresponding media item in the local media collection and the one or more shared media collections.

14. The method of claim 13 wherein aggregating the one or more shared media collections and the local media collection of the first user further comprises, for each sub-list:

scoring each media item entry in the sub-list based on at least one criterion selected from a group consisting of: a quality of a corresponding media item, a bitrate used to encode the corresponding media item, and an availability of the corresponding media item; and selecting a media item entry from the sub-list for use in the primary list based on scores assigned to the media item entries in the sub-list as a result of the scoring.

15. The method of claim 14 further comprising providing the primary list to the first user as the aggregate media collection of the first user.

16. The method of claim 1 wherein the first user is charged a predetermined fee by a service provider for each shared media collection greater than a threshold.

17. The method of claim 1 wherein discovering the plurality of shared media collections comprises automatically detecting one of the plurality of shared media collections shared by one of the plurality of second users associated with one of the plurality of second user devices within a subnetwork of the first user device of the first user.

18. The method of claim 1 wherein discovering the plurality of shared media collections comprises automatically being notified of one of the plurality of shared media collections shared by one of the plurality of second users associated with one of the plurality of second user devices within a subnetwork of the first user device of the first user.

19. The method of claim 1, wherein discovering the plurality of shared media collections comprises:

providing an invitation to one of the plurality of second users; and receiving an acceptance from the one of the plurality of second users.

20. A physical user device comprising:

a) a communication interface comprising at least one hardware component communicatively coupling the physical user device to a network; and b) a control system, associated with the communication interface, adapted to:

i) discover a plurality of shared media collections made available to a first user of the physical user device by a plurality of second users of a plurality of second user devices, wherein media items in the plurality of shared media collections comprise at least one media item from a local media collection of a user having a direct relationship with the first user in a social network and at least one media item from a local media collection of a user having an indirect relationship with the first user in the social network;

ii) aggregate one or more shared media collections from the plurality of shared media collections and the local media collection of the first user to provide an aggregate media collection for the first user at the physical user device;

iii) enable the first user to utilize the aggregate media collection at the physical user device;

iv) score media items in the aggregate media collection based on user preferences of the first user to provide a desirability score for each of the media items: and v) filter the aggregate media collection based on a threshold score and the desirability scores for the media items in the aggregate media collection to provide a filtered version of the aggregate media collection.

21. A non-transitory computer readable medium storing software adapted to instruct a control system of a user device to:

discover a plurality of shared media collections made available to a first user of the user device by a plurality of second users of a plurality of second user devices, wherein media items in the plurality of shared media collections comprise at least one media item from a local media collection of a user having a direct relationship with the first user in a social network and at least one media item from a local media collection of a user having an indirect relationship with the first user in the social network;

aggregate one or more shared media collections from the plurality of shared media collections and the local media collection of the first user to provide an aggregate media collection for the first user at the user device;

enable the first user to utilize the aggregate media collection at the user device;

score media items in the aggregate media collection based on user preferences of the first user to provide a desirability score for each of the media items; and filter the aggregate media collection based on a threshold score and the desirability scores for the media items in the aggregate media collection to provide a filtered version of the aggregate media collection.

* * * * *